United States Patent
Rapp

(10) Patent No.: US 9,054,495 B2
(45) Date of Patent: Jun. 9, 2015

(54) OPTICAL FIBER AMPLIFIER WITH IMPROVED PERFORMANCE

(75) Inventor: Lutz Rapp, Deisenhofen (DE)

(73) Assignee: Xieon Networks S.a.r.l., Luxembourg (LU)

( * ) Notice: Subject to any disclaimer, the term of this patent is extended or adjusted under 35 U.S.C. 154(b) by 233 days.

(21) Appl. No.: 13/508,441

(22) PCT Filed: Nov. 5, 2010

(86) PCT No.: PCT/EP2010/066944
§ 371 (c)(1),
(2), (4) Date: May 7, 2012

(87) PCT Pub. No.: WO2011/054942
PCT Pub. Date: May 12, 2011

(65) Prior Publication Data
US 2012/0229887 A1    Sep. 13, 2012

(30) Foreign Application Priority Data
Nov. 6, 2009  (EP) ..................................... 09175269

(51) Int. Cl.
| H04B 10/296 | (2013.01) |
| H01S 3/13 | (2006.01) |
| H01S 3/067 | (2006.01) |
| H04B 10/293 | (2013.01) |
| H01S 3/10 | (2006.01) |
| H04B 10/25 | (2013.01) |

(52) U.S. Cl.
CPC ............ *H01S 3/1305* (2013.01); *H04B 10/296* (2013.01); *H01S 3/06754* (2013.01); *H04B 10/2931* (2013.01); *H01S 3/10015* (2013.01); *H01S 3/1301* (2013.01)

(58) Field of Classification Search
CPC .................................................... H01S 3/06754
USPC .......................................... 359/341.4, 341.41
See application file for complete search history.

(56) References Cited

U.S. PATENT DOCUMENTS

| 5,986,799 A * | 11/1999 | Itou et al. ....................... 359/337 |
| 6,975,449 B1 | 12/2005 | Mok et al. |
| 7,400,443 B1 | 7/2008 | Sridhar et al. |
| 7,535,632 B2 | 5/2009 | Rapp |
| 2003/0035206 A1* | 2/2003 | Pavel et al. .................. 359/341.4 |
| 2008/0037109 A1* | 2/2008 | Rapp ............................ 359/337.1 |
| 2008/0239469 A1 | 10/2008 | Onaka et al. |
| 2009/0207484 A1 | 8/2009 | Shia et al. |

* cited by examiner

*Primary Examiner* — Eric Bolda
(74) *Attorney, Agent, or Firm* — Nelson Mullins Riley & Scarborough LLP

(57) ABSTRACT

A method for controlling a variation in gain in an optical amplifier stage and an optical amplifier. The optical amplifier stage includes a pumping device for providing pumping power and a control unit for determining a change in an input power of the optical amplifier. The method includes the steps of determining a change in an input power of the optical amplifier, adjusting a pumping power of the pumping device to a first power level for a predetermined period of time and adjusting the pumping power of the pumping device to a second power level. The second power level is able to drive the amplifier gain to a predetermined gain value after the change in the input power occurred.

20 Claims, 14 Drawing Sheets

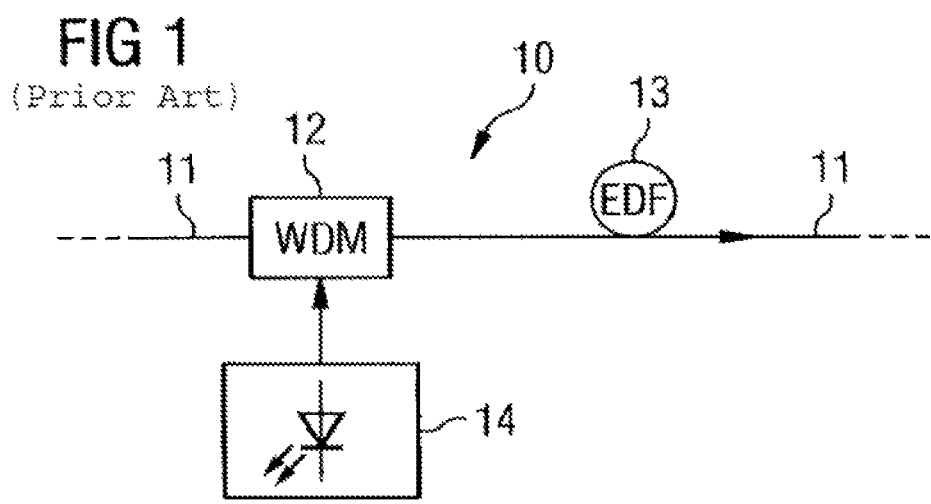

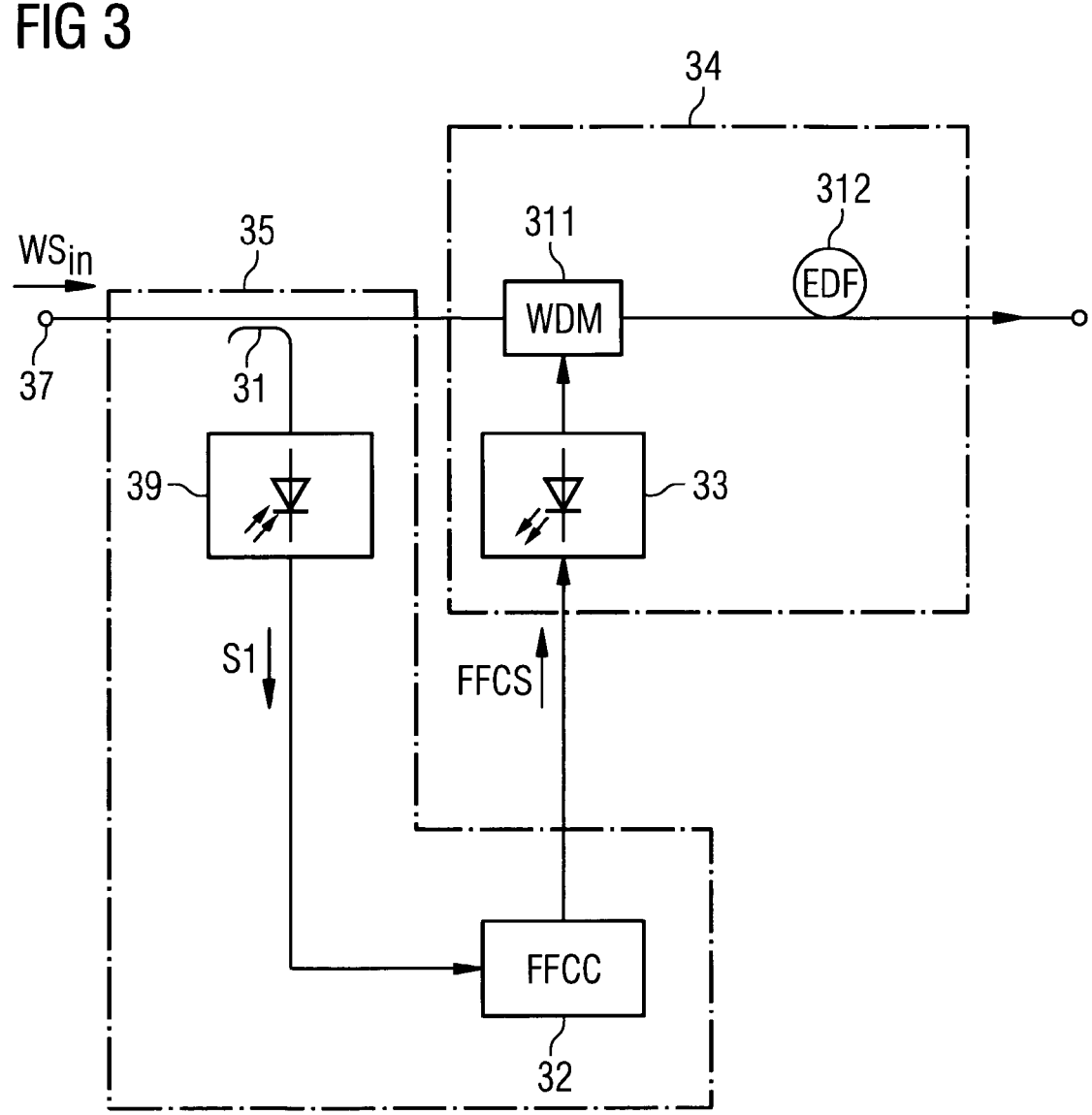

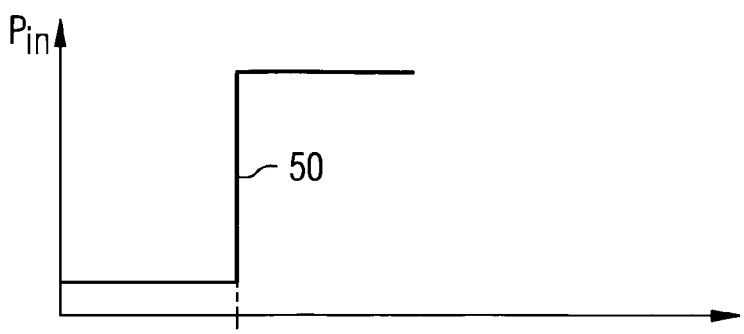
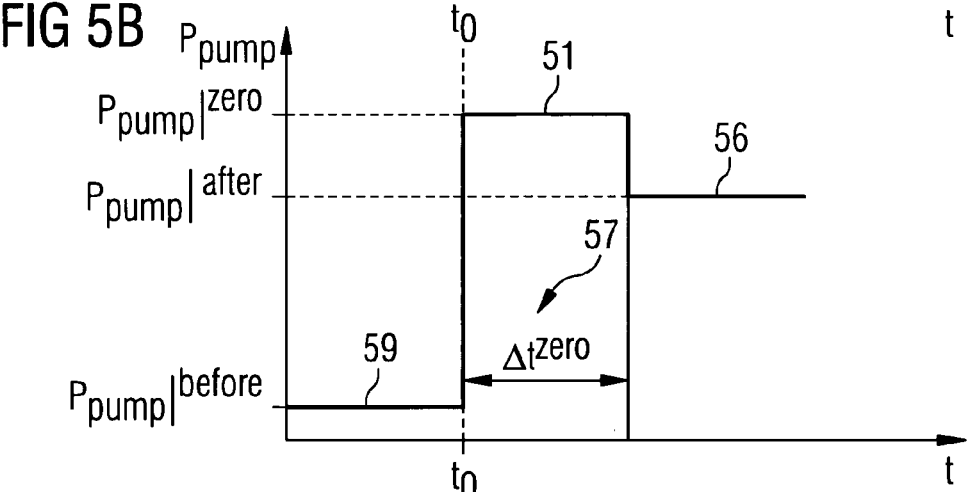
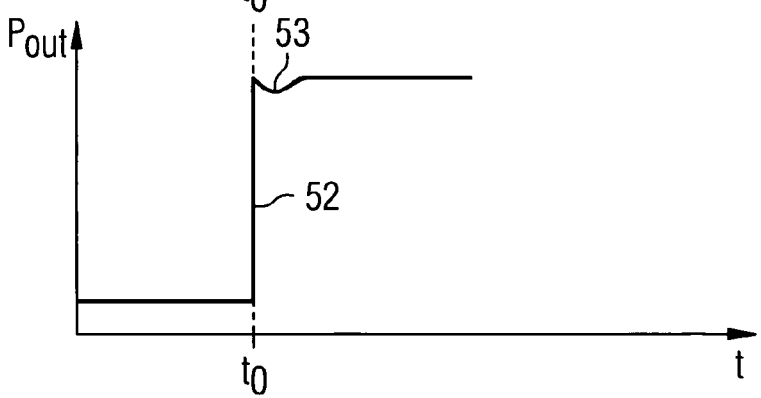
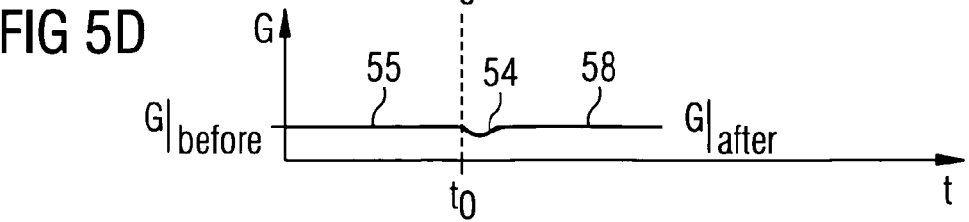
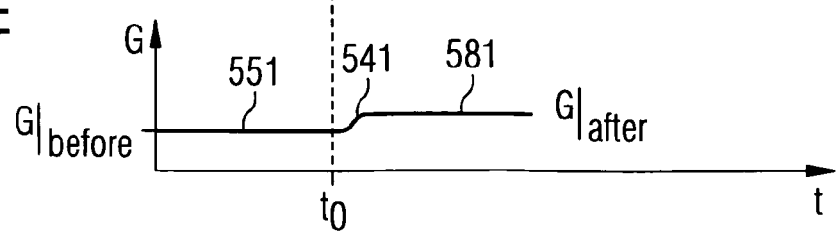

OPTICAL FIBER AMPLIFIER WITH IMPROVED PERFORMANCE

FIELD OF THE INVENTION

The invention refers to a method for controlling an optical amplifier and an amplifier arrangement

BACKGROUND OF THE INVENTION

Optical amplifiers are employed in the field of optical transmission technology for amplifying the optical signals transmitted in an optical network. The optical signals in many cases propagate over long links measuring several hundred kilometers and more in an optical fiber, being attenuated in the process. It is therefore necessary to amplify the optical signals when they have been transmitted over a long distance.

Optical links and networks of this type frequently employ Wavelength Division Multiplexing (WDM), a technique whereby a plurality of channels is transmitted in an optical fiber simultaneously at various wavelengths.

Erbium-doped fiber amplifiers (EDFAs) are largely employed in WDM transmission systems. An EDFA operates using an erbium-doped fiber into which the light from an optical pump, for example a laser diode, is coupled. The optical signal launched into the doped fiber is therein amplified by means of stimulated photon emission.

FIG. 1 shows a schematic representation of a conventional amplifier stage 10 of an optical amplifier that uses an erbium-doped fiber EDF 13. The amplifier stage further includes a WDM coupler 12 and an optical pumping device 14 whose light is coupled via the WDM coupler 12 into the doped fiber 13. The WDM signal (comprising, for instance, 80 channels) guided in the optical fiber 11 is amplified in the doped fiber 13 through stimulated emission. The amplifier gain is dependent on the pumping power of the pump 14 and is set by a control device (not shown) as required.

Addition and removal of individual channels of the WDM signal being transmitted on the fiber, component failures, fiber breaks or protection switching result in abrupt changes in power at the input of the amplifier. The pumping power of the optical pump has to be quickly matched to different input powers. The amplifier gain (defined as the output power/input power) would otherwise change and the output power of the individual signals would increase or decrease, as a consequence of which bit errors may occur at the receiver. Particularly in the case of multistage amplifiers, the deviations in gain in the individual stages can accumulate so that bit errors can very readily occur. A critical factor in the development of an optical amplifier is hence to maintain as constant as possible an amplifier gain even when large abrupt changes in power occur at the amplifier input.

FIGS. 2a-2d show the operation of a conventional amplifier stage 10 of an optical amplifier in an abrupt channel drop scenario and in particular the overshoot 23 and 24 which occurs immediately after a switching operation in the output signal $P_{out}$ and in the gain G of an amplifier stage 10. FIG. 2a shows the curve of the input power $P_{in}$ of an optical signal having, for example, 80 channels of equal power with a spacing of 50 GHz (0.4 nm) in the conventional wavelength band (C-band) that is being applied to the input of the amplifier stage. For example, at the instant $t_0$, 79 of the 80 channels are removed from the amplifier, as a result of which the total power at the input $P_{in}$ abruptly drops 20. FIG. 2b shows the curve of the pumping power $P_{pump}$. As can be seen, the pumping power $P_{pump}$ is abruptly reduced 21 from the value $P_{pump}|^{before}$ (which keeps the gain G at a constant level 25 before the drop) to the value $P_{pump}|^{after}$ (which keeps the gain G at a constant level 26 after the drop) shortly after the instant $t_0$ in response to the abrupt change 20 of the input power $P_{in}$. FIG. 2c shows the output power $P_{out}$ of the amplifier stage, which likewise displays an abrupt change 22 approximately at the instant $t_0$, which output power $P_{out}$ likewise contains the overshoot 23 immediately after the instant $t_0$. FIG. 2d shows the gain G of the amplifier stage 10, which gain is kept at a constant level before 25 and after 26 the drop and likewise contains the overshoot 24. There would be analogous undershooting if channels were added.

A large number of methods are known from the prior art whereby the amplifier gain can be kept substantially constant when there is a change in input power. One known method, for example, includes the use of a feedforward controller which measures the change in input power and, as a function thereof, calculates a new pumping power that will be set on the pump immediately thereafter. But there are typically some inaccuracies leading to permanent deviation from the target gain of the amplifier. The main difficulty with this lies in calculating the new pumping power correctly so that the amplifier gain will remain substantially constant. The pumping power is dependent not only on the amplifier's input power but also on the other channels' wavelength after the switching operation, and on other influencing variables. Basing the calculation of the pumping power requiring to be newly set solely on the change in power at the input is thus relatively imprecise.

Other known methods combine the feedforward controller with a feedback controller, which introduces over a longer period of time small modifications to the pump power level and thus helps to recover the original gain of the amplifier over time.

However, variations (overshooting or undershooting) in the amplifier gain will also occur after a switching operation even when the pumping power is optimally matched to a changed input power (which is to say is changed to the correct value in a single step). Said variations are due to the memory effect of the doping element in the fiber. The electrons in the doping element (erbium, for example) are, by means of optical pumps, first raised to a third higher energy level from which they drop, in a non-emitting state transition, to a lower metastable energy level. There will always still be many electrons at the third higher energy level when the pumping power is reduced abruptly, and these will later contribute to (undesired) intermediate gain variations. In particular, when using optical pumps with an emission wavelength around 980 nm, there is a theoretical limit for the minimum achievable deviations due to population of the third higher energy level. These intermediate gain variations can be detected as overshoots in the output power which, especially in the case of multistage amplifiers, can result in bit errors at the receiver through accumulation.

Based upon the above discussions, it is concluded that there is a need in the art, for an improved system and method for controlling an optical amplifier gain. The improved system and method should be capable of controlling an optical pump in such a fashion that the intermediate gain variations due to the memory effect of the doping element in the fiber are strongly reduced.

SUMMARY OF THE INVENTION

In order to overcome the above-described need in the art, the present invention discloses a method for controlling a variation in gain of an optical amplifier, the optical amplifier including a pumping device, the method comprising: determining a change in an input power of the optical amplifier, adjusting a pumping power of the pumping device to a first power level $P_{pump}|^{zero}$ for a predetermined period of time ($\Delta t^{zero}$, $\Delta t_{opt}^{zero}$, $\Delta t_{opt}^{zero}|^{(i)}$), adjusting the pumping power of the pumping device to a second power level $P_{pump}|^{after}$, the second power level being able to drive the amplifier gain to a predetermined gain value $Gl_{after}$ after that the change in the input power occurred.

It is also an embodiment, that the predetermined gain value $Gl_{after}$ is essentially equal to a first gain value $Gl_{before}$, the first gain value $Gl_{before}$ being the gain of the amplifier before that the change in the input power occurred.

In a further embodiment, the method comprises the step of determining the second power level $P_{pump}|^{after}$.

In a next embodiment, the method comprises the step of determining a third power level $P_{pump}|^{before}$ which keeps the gain of the amplifier at the first gain value $Gl_{before}$.

It is also an embodiment, that the change in the input power of the optical amplifier occurs abruptly.

In a further embodiment, the method comprises the step of determining the predetermined period of time $\Delta t_{opt}^{zero}$ based on the equation:

$$\Delta t_{opt}^{zero} = \tau_3 \ln\left\{\frac{\alpha_{fit} P_{pump}^{eff}|^{before}+1}{\alpha_{fit} P_{pump}^{eff}|^{after}+1}\right\},$$

wherein $\tau_3$ stands for the lifetime of the pump level, $\alpha_{fit}$ is a parameter including the density of the erbium ions, $P_{pump}^{eff}|^{before}$ is given by the equation $$P_{pump}^{eff}|^{before} = P_0^{ESA} \ln\left(\frac{P_{pump}|^{before}}{P_0^{ESA}}+1\right),$$

$P_{pump}|^{before}$ being the third power level and $P_{pump}^{eff}|^{after}$ is given by the following equation $$P_{pump}^{eff}|^{after} = P_0^{ESA} \ln\left(\frac{P_{pump}|^{after}}{P_0^{ESA}}+1\right),$$

$P_{pump}|^{after}$ being the second power level and $P_0^{ESA}$ being the characteristic power.

According to another embodiment, the change in the input power of the optical amplifier occurs approximately linearly with the time.

In a further embodiment, the method comprises the step of adjusting successively and alternatively the pumping power of the pumping device at intermediate power levels $P_{pump}|^{(i)}$ and at the first power level $P_{pump}|^{zero}$ for predetermined periods of time $\Delta t_{opt}^{zero}|^{(i)}$.

In a next embodiment, the method comprises the step of determining the intermediate power levels $P_{pump}|^{(i)}$ by using means for measuring or means for calculating, said means for measuring or means for calculating including digital signal processors;

In a next embodiment, the step of determining the intermediate power levels $P_{pump}|^{(i)}$ further includes calculating the effective power levels $P_{pump}^{eff}|^{(i)}$.

It is also an embodiment, that the determination of the intermediate power levels $P_{pump}|^{(i)}$ and $P_{pump}^{eff}|^{(i)}$ occurs with a sampling rate of approximately 1 MHz;

In a further embodiment, the method comprises the step of determining the predetermined periods of time $\Delta t_{opt}^{zero}|^{(i)}$ based on the iterative equation:

$$\Delta t_{opt}^{zero}|^{(i)} = \tau_3 \ln\left\{\frac{\alpha_{fit} P_{pump}^{eff}|^{(i-1)}+1}{\alpha_{fit} P_{pump}^{eff}|^{(i)}+1}\right\},$$

wherein $\tau_3$ stands for the lifetime of the pump level and $\alpha_{fit}$ is a parameter including the density of the erbium ions.

According to another embodiment, the change in the input power of the optical amplifier is based upon one or more events selected from the group consisting of: removing a channel of the WDM signal transmitted, fiber break, protection switching, and component failures.

In a next embodiment, the first power level $P_{pump}|^{zero}$ is lower than the second power level $P_{pump}|^{after}$.

It is also an embodiment that the first power level $P_{pump}|^{zero}$ is approximately zero.

In a further embodiment, the change in the input power of the optical amplifier is based upon adding a channel of the WDM signal transmitted In a next embodiment, the second power level $P_{pump}|^{after}$ is lower than the first power level $P_{pump}|^{zero}$.

In embodiments of the present invention, the optical amplifier is a single stage amplifier.

In other embodiments of the present invention, the optical amplifier is a stage of a multistage amplifier.

The problem stated above is also solved by an optical amplifier for amplifying a Wavelength Division Multiplexing signal, comprising a pumping device for providing pumping power, a control unit for determining a change in an input power of the optical amplifier, wherein, when a change in the input power of the optical amplifier occurs, the control unit is operable to adjust a pumping power of the pumping device to a first power level $P_{pump}|^{zero}$ for a predetermined period of time ($\Delta t^{zero}$, $\Delta t_{opt}^{zero}$, $\Delta t_{opt}^{zero}|^{(i)}$) and later to a second power level $P_{pump}|^{after}$, the second power level being able to drive the amplifier gain to a predetermined gain value $Gl_{after}$ after that the change in the input power occurred.

In embodiments of the present invention, the control unit is adjustable to operate a feedforward control.

In other embodiments of the present invention, the control unit is adjustable to operate a feedforward and a feedback control.

BRIEF DESCRIPTION OF THE DRAWINGS

The invention is explained by way of example in more detail below with the aid of the attached drawings.

FIG. 1 is a high level block diagram of an amplifier stage of an optical amplifier having an erbium-doped fiber;

FIG. 3 is a high level block diagram of an amplifier stage with feedforward controller of an optical amplifier according to one embodiment of the invention;

FIG. 5a is an illustration of the curve of the input power of an optical signal applied to the input of an optical amplifier in a channel adding scenario according to a third embodiment of the invention;

FIG. 5b is an illustration of the curve of the pumping power of an optical amplifier in a channel adding scenario according to a third embodiment of the invention;

FIG. 5c is an illustration of the curve of the total signal output power of an optical amplifier in a channel adding scenario according to a third embodiment of the invention;

FIG. 5d is an illustration of the curve of the gain of an optical amplifier in a channel adding scenario according to a third embodiment of the invention;

FIG. 5e is an illustration of the curve of the gain of an optical amplifier in an abrupt channel drop scenario according to a fourth embodiment of the invention;

DESCRIPTION OF THE INVENTION

Figure 2A:
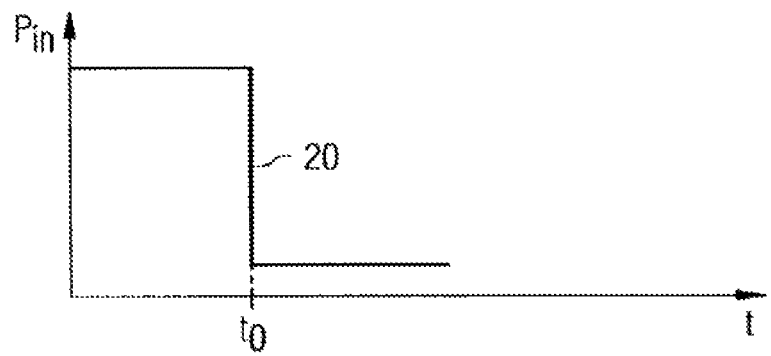
FIG. 2a is an illustration of the curve of the input power of an optical signal applied to the input of an optical amplifier in an abrupt channel drop scenario.
Figure 2B:
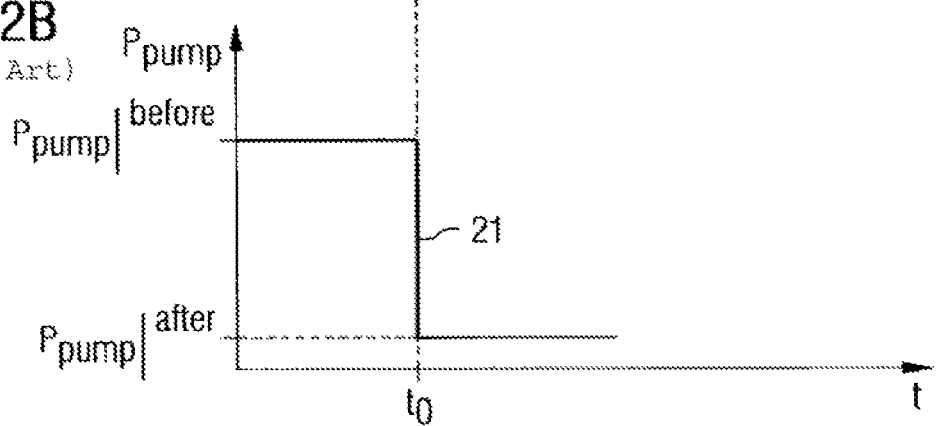
FIG. 2b is an illustration of the curve of the pumping power of an optical amplifier in an abrupt channel drop scenario.
Figure 2C:
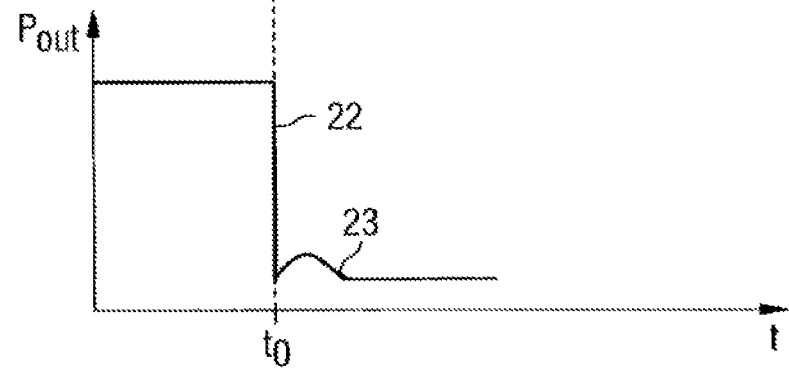
FIG. 2c is an illustration of the curve of the total signal output power of an optical amplifier in an abrupt channel drop scenario.
Figure 2D:
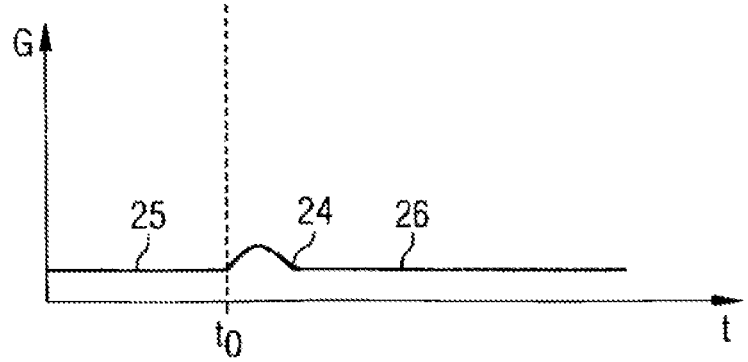
FIG. 2d is an illustration of the curve of the gain of an optical amplifier in an abrupt channel drop scenario.

As regards the description of FIGS. 1 to 2d, reference is made to the background of the invention.

Illustrative embodiments will now be described with reference to the accompanying drawings to disclose the teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 3 is a high level block diagram which illustrates an amplifier stage 34 of an optical amplifier and a control unit 35 according to a first embodiment of the invention. The amplifier stage uses an erbium-doped fiber EDF 312 and further includes a WDM coupler 311 and an optical pumping device 33 whose light is coupled via the WDM coupler 311 into the erbium-doped fiber EDF 312. The WDM signal guided in the erbium-doped fiber EDF 312 is amplified in the erbium-doped fiber EDF 312 through stimulated emission. The amplifier gain is dependent on the pumping power of the pump 33 and is set by the control unit 35. The control unit 35 includes a power splitter 31 arranged between the amplifier's input 37 and the WDM coupler 311 and an optical-electrical converter 39 for converting the amplifier's input signal $WS_{in}$ into an electrical input measuring signal S1 which feeds the feedforward control circuit FFCC 32. The feedforward control circuit FFCC 32 outputs a feedforward control signal FFCS which controls the pumping power of the pumping device 33. Once the control unit 35 determines a change in the input power through the power splitter 31, the feedforward control circuit FFCC 32 of the present invention first adjusts the pumping power of the pumping device 33 to a first power level ($P_{pump}|^{zero}$) for a predetermined period of time ($\Delta t^{zero}$) and then adjusts the pumping power of the pumping device to a second power level ($P_{pump}|^{after}$), said second power level ($P_{pump}|^{after}$) being able to drive the amplifier gain (G) to a predetermined gain value ($G|_{after}$) after that the change in the input power occurred. In particular, in another embodiment of the invention, the predetermined gain value ($G|_{after}$) may be essentially equal to a first gain value ($G|_{before}$), the first gain value ($G|_{before}$) being the gain of the amplifier before that the change in the input power occurred. In this way the intermediate gain variations due to the memory effect introduced by the third higher energy level are strongly reduced and consequently overshoots and undershoots of the gain of the amplifier stage 34 are strongly minimized, in particular when the predetermined period of time ($\Delta t^{zero}$) is set at its optimum value $\Delta t_{opt}^{zero}$, the overshoots and undershoots of the gain of the amplifier stage 34 are minimized.

FIGS. 4a-4e show the operation of the amplifier stage 34 with feedforward control circuit FFCC 32 according to a first embodiment of the invention. In particular, FIGS. 4a-4e show the operation of the feedforward control circuit FFCC 32 of the invention in an abrupt channel drop scenario and the consequent reduction of the overshoots 43, 44 and 441.

Figure 4A:
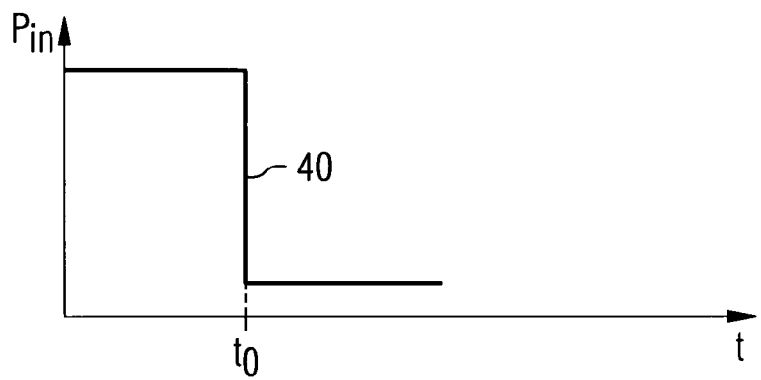
FIG. 4a is an illustration of the curve of the input power of an optical signal applied to the input of an optical amplifier in an abrupt channel drop scenario according to a first embodiment of the invention.

FIG. 4a shows the curve of the input power $P_{in}$ of an optical signal having, for example, 80 channels of equal power with a spacing of 50 GHz (0.4 nm) in the conventional wavelength band (C-band) that is being applied to the input of the amplifier stage. For example, at the instant $t_0$, 79 of the 80 channels are removed from the amplifier, as a result of which the power at the input $P_{in}$ abruptly drops 40. This situation may also occur as a consequence of a fiber break, a component failure or a protection switching. In this abrupt drop scenario may be also included the situation in which a change in the input power of the optical amplifier occurs within 1 μs.

Figure 4B:
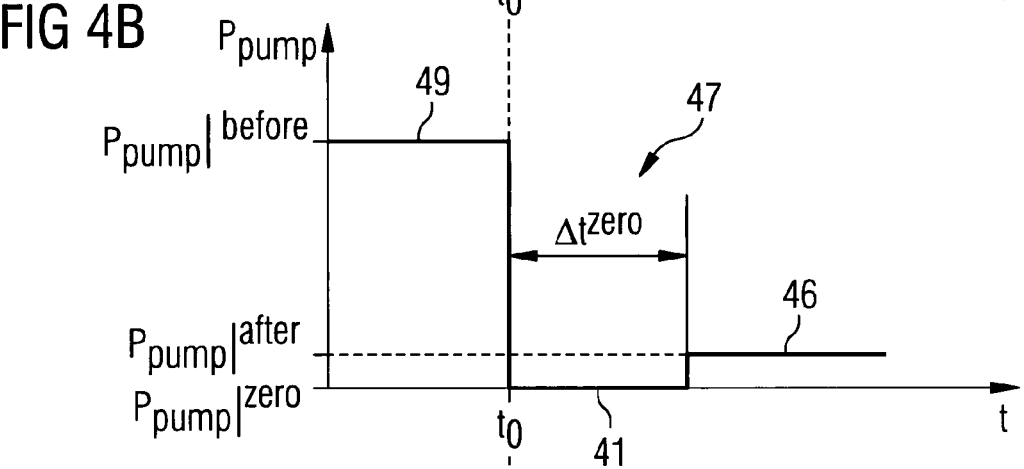
FIG. 4b is an illustration of the curve of the pumping power of an optical amplifier in an abrupt channel drop scenario according to a first embodiment of the invention.

FIG. 4b shows the curve of the pumping power $P_{pump}$ and in particular how the pumping device 33, controlled by the feedforward control circuit FFCC 32, operates according to a first embodiment of the invention. $P_{pump}|^{before}$ 49 is the value which keeps the gain G at a constant level $G|_{before}$ (45, 451) before the removal of the channels (which occurs at the instant $t_0$), and $P_{pump}|^{after}$ 46 is the value which keeps the gain G at a constant level $G|_{after}$ (48, 481) after the removal of the channels on steady-state conditions. Once the control unit 35 determines a change in the input power, the feedforward control circuit FFCC 32 of the present invention first adjusts the pumping power of the pumping device 33 to a first power level ($P_{pump}|^{zero}$) 41 for a predetermined period of time ($\Delta t^{zero}$) 47 and then adjusts the pumping power of the pumping device to a second power level ($P_{pump}|^{after}$) 46. In the abrupt channel drop scenario described in FIGS. 4a-4e according to an embodiment of the invention, the first power level ($P_{pump}|^{zero}$) 41 is lower than the second power level ($P_{pump}|^{after}$) 46. In particular, in the embodiment illustrated in FIG. 4b the first power level ($P_{pump}|^{zero}$) 41 is set to zero, although in other embodiment, the first power level ($P_{pump}|^{zero}$) 41 may be also be different from zero. However, the predetermined period of time ($\Delta t^{zero}$) 47 in which the pumping power of the pumping device 33 is adjusted to the first power level ($P_{pump}|^{zero}$) 41 and may be also referred to as "zero period" even if the first power level ($P_{pump}|^{zero}$) 41 is not necessarily adjusted to zero. When the predetermined period of time ($\Delta t^{zero}$) is set to its optimum value $\Delta t_{opt}^{zero}$ (also referred to as "optimum zero period"), the overshoots of the gain of the amplifier stage 34 are minimized.

Figure 4C:
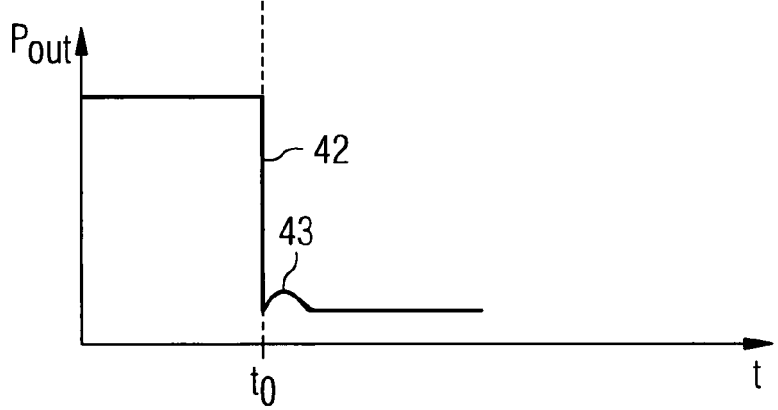
FIG. 4c is an illustration of the curve of the total signal output power of an optical amplifier in an abrupt channel drop scenario according to a first embodiment of the invention.

FIG. 4c shows the total signal output power $P_{out}$ of the amplifier stage 34 according to an embodiment of the invention, which displays an abrupt change 42 approximately at the instant $t_0$, which total signal output power $P_{out}$ contains a strongly reduced overshoot 43 compared with conventional optical amplifiers.

Figure 4D:
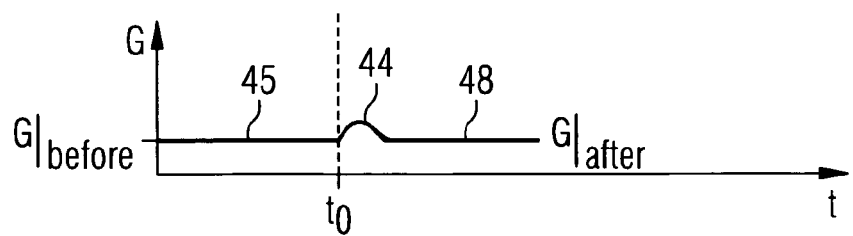
FIG. 4d is an illustration of the curve of the gain of an optical amplifier in an abrupt channel drop scenario according to a first embodiment of the invention.

FIG. 4d shows the gain G of the amplifier stage 34, which gain is kept at a constant level before $G|_{before}$ 45, and after $G|_{after}$ 48 the drop and contains a strongly reduced overshoot 44 compared with conventional optical amplifiers. In the embodiment of FIG. 4d the gain values $G|_{before}$ 45 and $G|_{after}$ 48 are substantially equal.

Figure 4E:
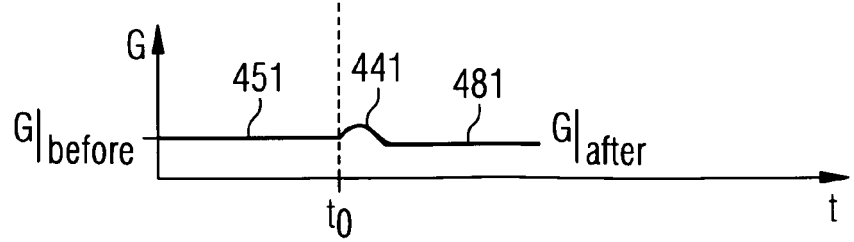
FIG. 4e is an illustration of the curve of the gain of an optical amplifier in an abrupt channel drop scenario according to a second embodiment of the invention.

FIG. 4e shows the gain G of the amplifier stage 34 according to an alternative embodiment of the invention, which gain is kept at a constant level before $G|_{before}$ 451, and after $G|_{after}$ 481 the drop and contains a strongly reduced overshoot 441 compared with conventional optical amplifiers. In the alternative embodiment of FIG. 4e the gain values $G|_{before}$ 451 and $G|_{after}$ 481 are different.

FIGS. 5a-5e shows the operation of the amplifier stage 34 with feedforward control circuit FFCC 32 according to another embodiment of the invention. In particular, FIGS. 5a-5e show the operation of the feedforward control circuit FFCC 32 of the invention in a channel adding scenario and the consequent reduction of the undershoots 53, 54 and 541.

FIG. 5a shows the curve of the input power $P_{in}$ of an optical signal having, for example, 1 channel that is being applied to the input of the amplifier stage. For example, at the instant $t_0$, 79 channels are added to the amplifier, as a result of which the power at the input $P_{in}$ abruptly rises 50.

FIG. 5b shows the curve of the pumping power $P_{pump}$ and in particular how the pumping device 33, controlled by the feedforward control circuit FFCC 32, operates according to a another embodiment of the invention. $P_{pump}|^{before}$ 59 is the value which keeps the gain G at a constant level $G|_{before}$ (55, 551) before the adding of the channels (which occurs at the instant $t_0$), and $P_{pump}|^{after}$ 56 is the value which keeps the gain G at a constant level $G|_{after}$ (58, 581) on steady-state conditions. Once the control unit 35 determines a change in the input power the feedforward control circuit FFCC 32 of the present invention first adjusts the pumping power of the pumping device 33 to a first power level ($P_{pump}|^{zero}$) 51 for a predetermined period of time ($\Delta t^{zero}$) 57 and then adjusts the pumping power of the pumping device to a second power level ($P_{pump}|^{after}$) 56. In the channel adding scenario described in FIGS. 5a-5e according to a second embodiment of the invention, the first power level ($P_{pump}|^{zero}$) 51 is higher than the second power level ($P_{pump}|^{after}$) 56.

FIG. 5c shows the total signal output power $P_{out}$ of the amplifier stage 34 according to another embodiment of the invention, which displays a change 52 approximately at the instant $t_0$, which total signal output power $P_{out}$ contains a strongly reduced undershoot 53 compared with conventional optical amplifiers. When the predetermined period of time ($\Delta t^{zero}$) is set to its optimum value $\Delta t_{opt}^{zero}$ ("optimum zero period"), the undershoots of the gain of the amplifier stage 34 are minimized.

FIG. 5d shows the gain G of the amplifier stage 34 according to another embodiment of the invention, which gain is kept at a constant level before $G|_{before}$ 55, and after $G|_{after}$ 58 the drop and contains a strongly reduced undershoot 54 compared with conventional optical amplifiers. In the embodiment of FIG. 5d the gain values $G|_{before}$ 55 and $G|_{after}$ 58 are substantially equal.

FIG. 5e shows the gain G of the amplifier stage 34 according to an alternative embodiment of the invention, which gain is kept at a constant level before $G|_{before}$ 551, and after $G|_{after}$ 581 the drop and contains a strongly reduced overshoot 541 compared with conventional optical amplifiers. In the alternative embodiment of FIG. 5e the gain values $G|_{before}$ 551 and $G|_{after}$ 581 are different.

Figure 6:
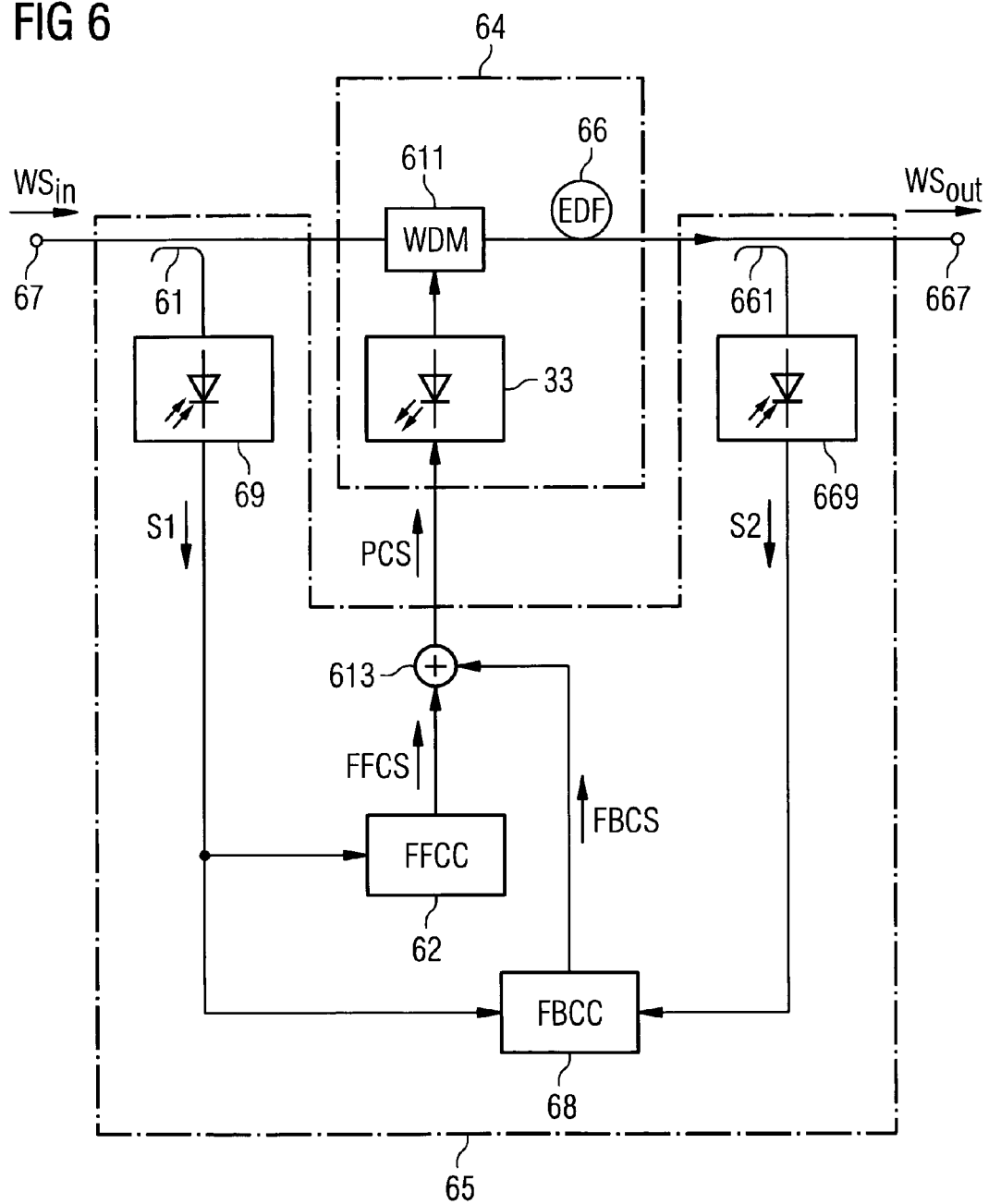
FIG. 6 is a high level block diagram of an amplifier stage with feedforward and feedback controllers of an optical amplifier according to one embodiment of the invention.

FIG. 6 is a high level block diagram which illustrates an amplifier stage 64 of an optical amplifier and a control unit 65 according to a fifth embodiment of the invention. The amplifier stage uses an erbium-doped fiber EDF 66 and further includes a WDM coupler 611 and an optical pumping device 63 whose light is coupled via the WDM coupler 611 into the doped fiber 66. The WDM signal is amplified in the erbium-doped fiber EDF 66 through stimulated emission. The amplifier gain is dependent on the pumping power of the pump 63 and is set by the control unit 65. The control unit 65 includes a first power splitter 61 arranged between the amplifier's input 67 and the WDM coupler 611, a second power splitter 661 arranged between erbium-doped fiber EDF 66 and the amplifier's output 667, a first optical-electrical converter 69 for converting the amplifier's input signal $WS_{in}$ into an electrical input measuring signal S1 which feeds the feedforward control circuit FFCC 62 and a second optical-electrical converter 669 for converting the amplifier's output signal $WS_{out}$ into an electrical out measuring signal S2 which feeds the feedback control circuit FBCC 68. The feedback control circuit FBCC 68 generates a feedback control signal FBCS which is combined with the feedforward control signal FFCS by an adder 613. The combination of the two controlling signals FBCS and FFCS generates the pump control signal PCS which controls the pumping power of the pumping device 63. Once the control unit 65 determines a change in the input power through the power splitter 61, the feedforward control circuit FFCC 62 of the present embodiment of the invention first adjusts the pumping power of the pumping device 63 at a first power level ($P_{pump}|^{zero}$) for a predetermined period of time ($\Delta t^{zero}$) and then adjusts the pumping power of the pumping device at a second power level ($P_{pump}|^{after}$), said second power level ($P_{pump}|^{after}$) being able to drive the amplifier gain (G) to a predetermined gain value ($G|_{after}$) after that the change in the input power occurred. In particular, in another embodiment of the invention, the predetermined gain value ($G|_{after}$) may be essentially equal to a first gain value ($G|_{before}$), the first gain value ($G|_{before}$) being the gain of the amplifier before that the change in the input power occurred. The feedforward control circuit FFCC 62 and the feedback control circuit FBCC 68 allow to adjust the gain and the output power to given target values and to compensate for control errors. In this way the intermediate gain variations due to the memory effect introduced by the third higher energy level are further reduced and consequently overshoots and undershoots of the gain of the amplifier stage 64 are strongly reduced. In particular when the predetermined period of time ($\Delta t^{zero}$, "zero period") is set at its optimum value $\Delta t_{opt}^{zero}$ ("optimum zero period"), the overshoots and undershoots of the gain of the amplifier stage 64 are minimized.

Figure 7A:
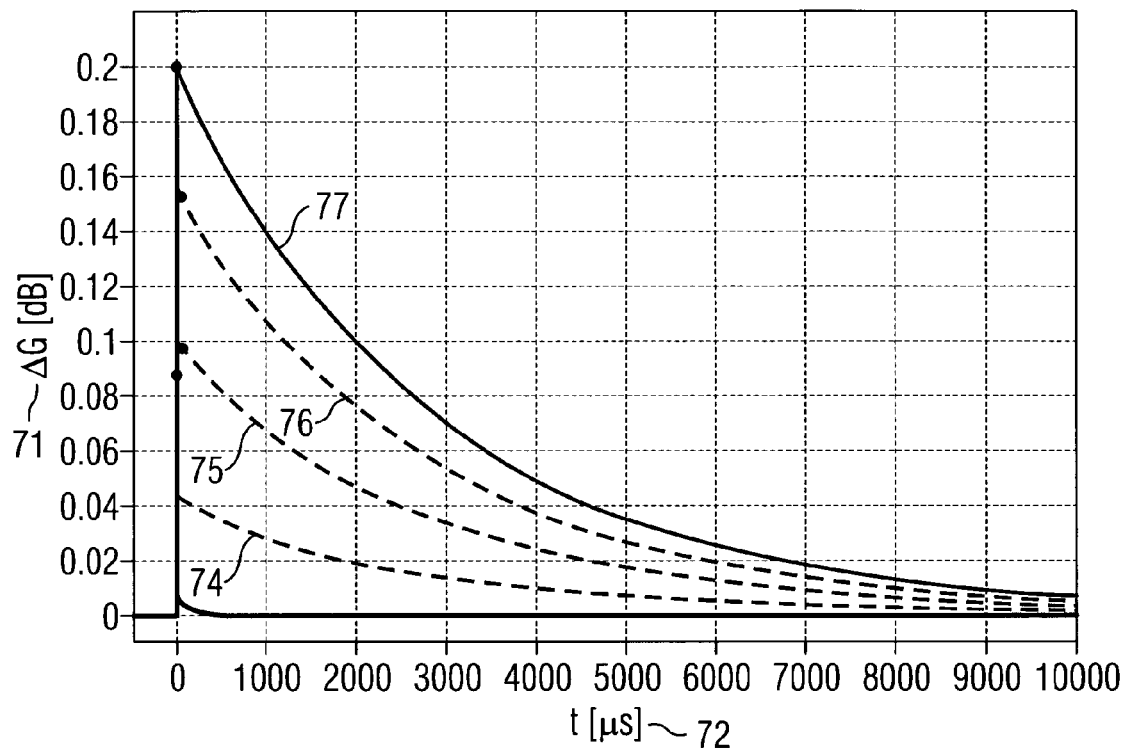
FIG. 7a is an illustration of a simulation which shows the curves of gain variation of an optical amplifier in an abrupt channel drop scenario for different durations of the "zero period" according to an embodiment of the invention.

FIG. 7a is an illustration of a simulation which shows the curves of the gain variation $\Delta G$ 71 of an optical amplifier in an abrupt channel drop scenario for different durations of the $\Delta t^{zero}$ ("zero period") according to an embodiment of the invention. For example, 80 channels of equal power are applied to the input of the amplifier stage 34 and at the instant t=0, 79 of the 80 channels are removed from the amplifier. The gain variation $\Delta G$ 71 (in dB) of the surviving channel at 1531.9 nm versus time t 72 (in µs) is shown as a result of a simulation for five different durations. In particular the curve 73 corresponds to a duration of the "zero period" of 18.5 µs, the curve 74 corresponds to a duration of the "zero period" of 15.0 µs, the curve 75 corresponds to a duration of the "zero period" of 10.0 µs, the curve 76 corresponds to a duration of the "zero period" of 5.0 µs and the curve 77 corresponds to a duration of the "zero period" of 0.0 µs. If the method disclosed by the present invention is employed, the maximum amplitude of overshoots, i.e. gain deviations to larger values, decreases by more than a factor of two and there is an even significantly larger reduction of the duration of the overshoots with respect to conventional methods. If the duration of the "zero period" $\Delta t^{zero}$ is set to its optimum value ($\Delta t_{opt}^{zero}$=18.5 µs), the overshooting is minimized and only a small needle remains.

Figure 7B:
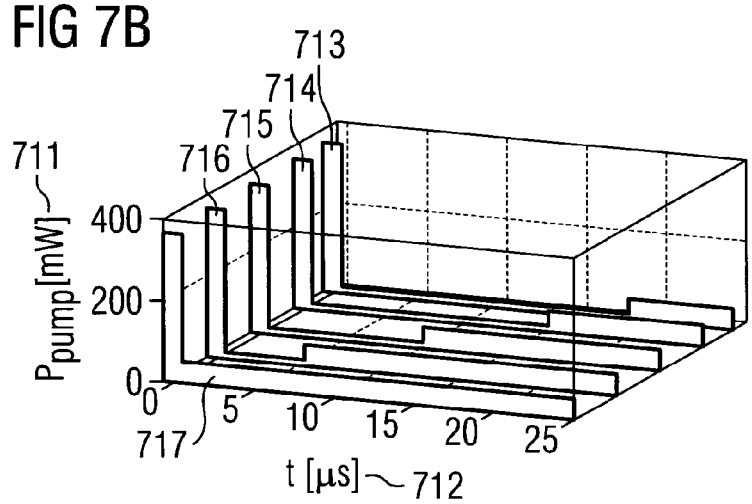
FIG. 7b is an illustration of a simulation which shows the curves of the pump power of an optical amplifier in an abrupt channel drop scenario for five different durations of the "zero period" according to an embodiment of the invention.

FIG. 7b is an illustration of a simulation which shows the curves of the pump power $P_{pump}$ of an optical amplifier in the same scenario described in FIG. 7a for different durations of the $\Delta t^{zero}$ ("zero period") according to an embodiment of the invention. The pump power $P_{pump}$ 711 (in dB) of the surviving channel at 1531.9 nm versus time t 712 (in µs) is shown as a result of a simulation for five different durations. In particular the curve 713 corresponds to a duration of the "zero period" of 18.5 µs ("optimum zero period"=$\Delta t_{opt}^{zero}$), the curve 714 corresponds to a duration of the "zero period" of 15.0 µs, the curve 715 corresponds to a duration of the "zero period" of 10.0 µs, the curve 716 corresponds to a duration of the "zero period" of 5.0 µs and the curve 717 corresponds to a duration of the "zero period" of 0.0 µs.

Figure 8:
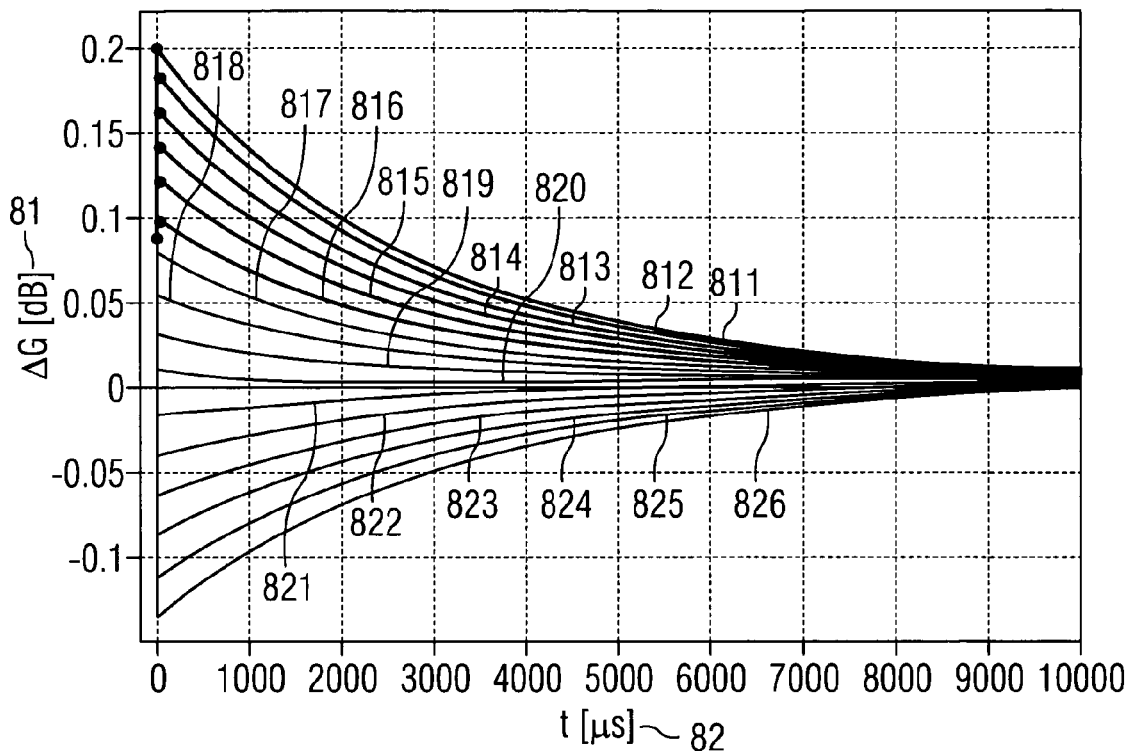
FIG. 8 is an illustration of a simulation which shows the curves of the gain variation of an optical amplifier in an abrupt channel drop scenario for different durations of the "zero period" according to an embodiment of the invention.

FIG. 8 is an illustration of a simulation which shows the curves of the gain variation $\Delta G$ 81 of an optical amplifier in an abrupt channel drop scenario for different durations of the $\Delta t^{zero}$ ("zero period") according to an embodiment of the invention. For example, 80 channels of equal power are applied to the input of the amplifier stage 34 and at the instant t=0, 79 of the 80 channels are removed from the amplifier. The gain variation $\Delta G$ 81 (in dB) of the surviving channel at 1531.9 nm versus time t 82 (in µs) is shown as a result of a simulation in for fifteen different durations. In particular the curve 811 corresponds to a duration of the "zero period" $\Delta t^{zero}$ of 0.0 µs, the curve 812 corresponds to a duration of the "zero period" $\Delta t^{zero}$ of 2.0 µs, the curve 813 corresponds to a duration of the "zero period" $\Delta t^{zero}$ of 4.0 µs, the curve 814 corresponds to a duration of the "zero period" $\Delta t^{zero}$ of 6.0 µs, the curve 815 corresponds to a duration of the "zero period" $\Delta t^{zero}$ of 8.0 µs, the curve 816 corresponds to a duration of the "zero period" $\Delta t^{zero}$ of 10.0 µs, the curve 817 corresponds to a duration of the "zero period" $\Delta t^{zero}$ of 12.0 µs, the curve 818 corresponds to a duration of the "zero period" $\Delta t^{zero}$ of 14.0 µs, the curve 819 corresponds to a duration of the "zero period" $\Delta t^{zero}$ of 16.0 µs, the curve 820 corresponds to a duration of the "zero period" $\Delta t^{zero}$ of 18.0 µs, the curve 821 corresponds to a duration of the "zero period" $\Delta t^{zero}$ of 20.0 µs, the curve 822 corresponds to a duration of the "zero period" $\Delta t^{zero}$ of 22.0 µs, the curve 823 corresponds to a duration of the "zero period" $\Delta t^{zero}$ of 24.0 µs, the curve 824 corresponds to a duration of the "zero period" $\Delta t^{zero}$ of 26.0 µs, the curve 825 corresponds to a duration of the "zero period" $\Delta t^{zero}$ of 28.0 µs and the curve 826 corresponds to a duration of the "zero period" $\Delta t^{zero}$ of 30.0 µs.

If the parameter $\Delta t^{zero}$ exceeds its optimum value ($\Delta t_{opt}^{zero}$="optimum zero period") which in this example is 18.5 µs, undershoots are induced.

Figure 9:
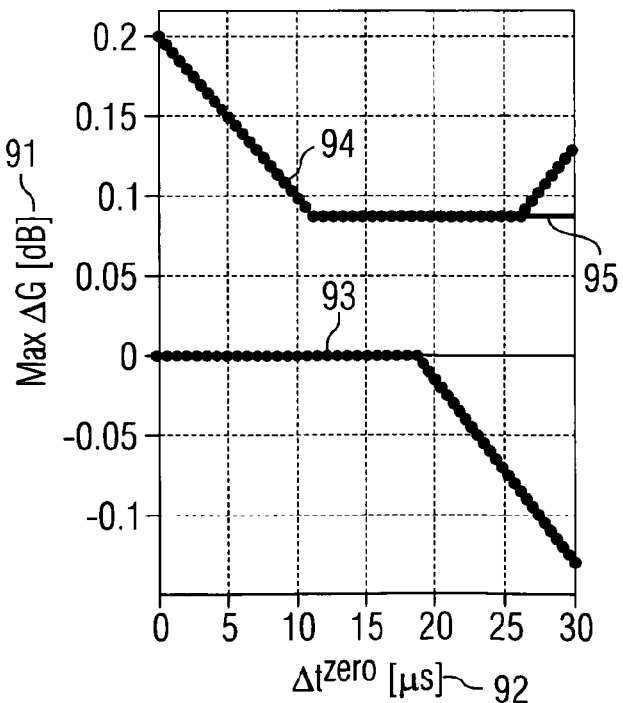
FIG. 9 is an illustration of a simulation which shows the effect of the zero period on the maximum value of the overshoots, the maximum value of the undershoots and the maximum value of the gain variations according to an embodiment of the invention.

FIG. 9 is an illustration of a simulation which shows the effect of the "zero period" $\Delta t^{zero}$ on some key parameters according to an embodiment of the invention.

Maximum gain variation (Max $\Delta G$ 91) is indicated versus duration of the "zero period" $\Delta t^{zero}$ 92. In particular, maximum positive gain variations 95 (maximum value of the overshoots), maximum negative gain variations 93 (maximum value of the undershoots), maximum value of both deviations 94 (maximum overall deviation) are shown. Gain variations to positive values decrease approximately linearly with increasing value of the "zero period" $\Delta t^{zero}$ 92 until a minimum value of the overshoots is reached. In the chosen example, overshoots are minimum for $\Delta t^{zero} \geq 11.0$ µs. It becomes also apparent that there are undershoots that increase approximately linearly with the duration of the zero period for $\Delta t^{zero} \geq 18.5$ µs. Therefore, the maximum magnitude of overshoots and undershoots is minimum for approximately $11.0 \text{ µs} \leq \Delta t^{zero} \leq 18.5 \text{ µs}$.

Figure 10:
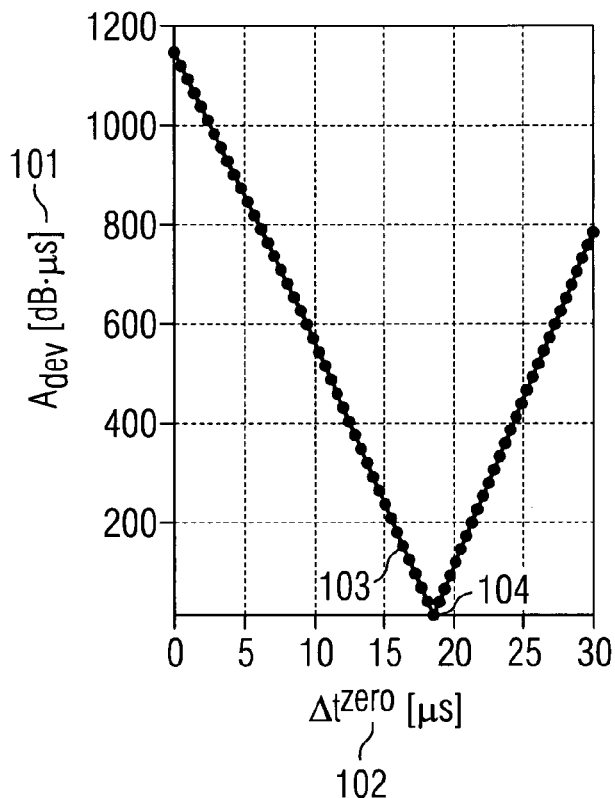
FIG. 10 is an illustration of a simulation which shows the effect of the "zero period" on the parameter $A_{dev}$ according to an embodiment of the invention.

FIG. 10 is an illustration of a simulation which shows the effect of the "zero period" $\Delta t^{zero}$ 102 on a parameter $A_{dev}$ 101, which describes the magnitude of the surface area between the gain variation plots (curves 811 to 826) in FIG. 8 and the time axis 82. In particular the parameter $A_{dev}$ 101 is defined as:

$$A_{dev} = \int_{-\infty}^{\infty} |\Delta G_{dB}(\tau_{int})| \cdot d\tau_{int} \tag{1}$$

The curve 103 in FIG. 10 shows the correlation between this parameters $A_{dev}$ 101 and the duration of the "zero period" $\Delta t^{zero}$ 102. There is a minimum 104 for $\Delta t^{zero}$=18.5 μs.

Figure 11:
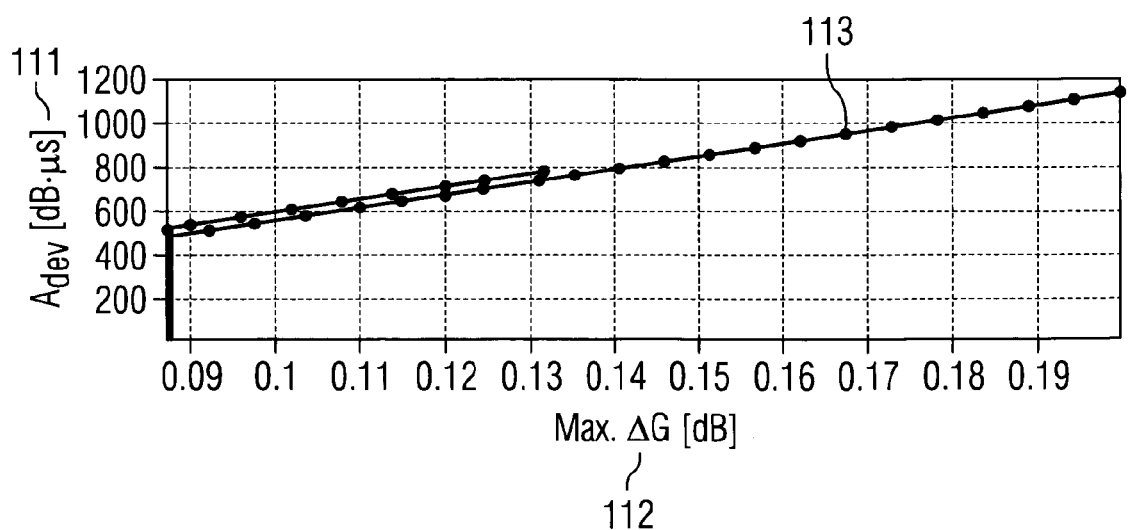
FIG. 11 is an illustration in form of a parametric representation of a simulation which shows the correlation between the parameters $A_{dev}$ and the maximum magnitude of the gain variation Max ΔG according to an embodiment of the invention.

FIG. 11 is an illustration in form of a parametric representation of a simulation which shows the correlation 113 between the parameters $A_{dev}$ 111 and the maximum magnitude of the gain variation Max $\Delta G$ 112 according to one embodiment of the invention. It can be seen that minimizing the parameter $A_{dev}$ may also lead to minimum gain overshoots.

Deeper insight into the transient behaviour of EDFAs can be gained considering basic equations describing the amplification provided by optical amplifiers. In logarithmic units, the gain of an EDFA is given by $$G_{dB} = \frac{10}{\ln 10} \{[\sigma_e^* + \sigma_a^*]\overline{P}_{pop}^{2nd} - \sigma_a^*(1-\overline{P}_{pop}^{3rd})\}L_{fiber} \tag{2}$$

where $\sigma_e^*$ and $\sigma_a^*$ denote the Giles parameters for emission and absorption, respectively. Both parameters are wavelength dependent. The parameter $L_{fiber}$ stands for the length of the doped fiber while $\overline{P}_{pop}^{2nd}$ and $\overline{P}_{pop}^{3rd}$ are the average population probabilities of the metastable and the pump level, respectively. Transient behaviour of an amplifier is mainly governed by the evolution of these two parameters ($\overline{P}_{pop}^{2nd}$ and $\overline{P}_{pop}^{3rd}$) that are the only figures in this equation depending on time. Large input power levels may require larger pump powers as compared with small input power levels in order to keep the amplifier gain constant. Since in general large pump powers come along with larger population probabilities of the pump level, there will be typically a change of $\overline{P}_{pop}^{3rd}$ in case of a drop of channels. According to equation (2), induced gain changes can be expressed by $$\Delta G_{dB} = \frac{10}{\ln 10} \{[\sigma_e^* + \sigma_a^*]\Delta\overline{P}_{pop}^{2nd} + \sigma_a^*\Delta\overline{P}_{pop}^{3rd}\} \tag{3}$$

where variations of the population probabilities of involved energy levels according to the equations $$\Delta\overline{P}_{pop}^{2nd}(t) = \overline{P}_{pop}^{2nd}(t) - \overline{P}_{pop}^{2nd}(t)|_{before\ drop}$$

$$\Delta\overline{P}_{pop}^{3rd}(t) = \overline{P}_{pop}^{3rd}(t) - \overline{P}_{pop}^{3rd}(t)|_{before\ drop}$$

have been introduced. The gain of a single surviving channel at wavelength $\lambda_{surv}$ may not be altered by the variation of the input power if the relation $$[\sigma_e^*(\lambda_{surv}) + \sigma_a^*(\lambda_{surv})]\Delta\overline{P}_{pop}^{2nd} = -\sigma_a^*(\lambda_{surv})\Delta\overline{P}_{pop}^{3rd} \tag{4}$$

is fulfilled. In other words, a linear relation between the variations of the two involved population probabilities may be required to keep the gain of a single surviving channel constant.

Figure 12:
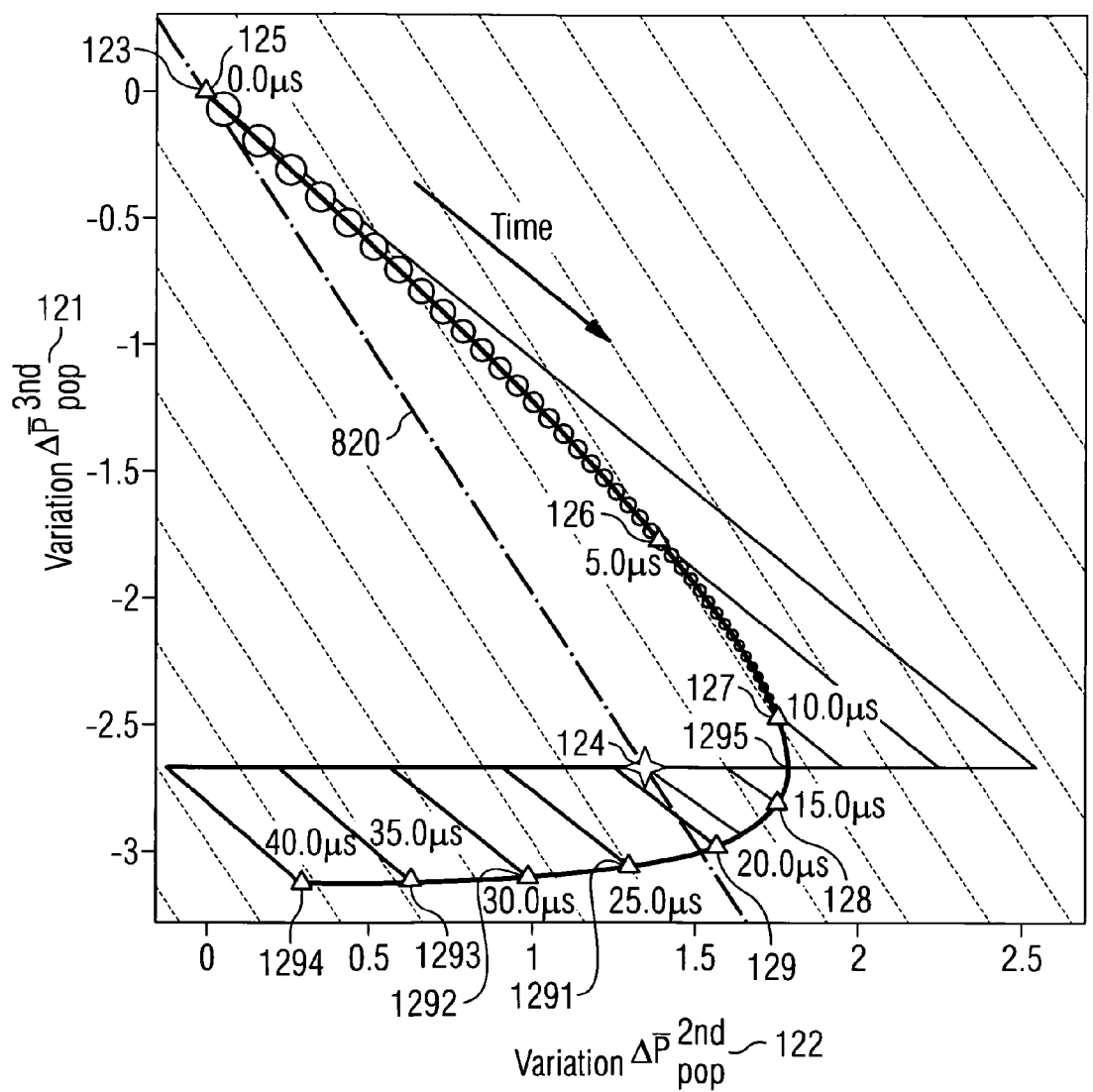
FIG. 12 is an illustration in form of a parametric representation of a simulation which shows the correlation between the two variation parameters $\Delta \overline{P}_{pop}^{3rd}$ and $\Delta \overline{P}_{pop}^{2nd}$ for a drop scenario and for different durations of the "zero period" according to one embodiment of the invention.

FIG. 12 is an illustration in form of a parametric representation of a simulation which shows the correlation between the two variation parameters $\Delta\overline{P}_{pop}^{3rd}$ 121 and $\Delta\overline{P}_{pop}^{2nd}$ 122 for the already considered drop scenario and for different durations of the "zero period" $\Delta t^{zero}$ according to one embodiment of the invention. The point 123 corresponds to the initial state, while the point 124 corresponds to the final state. The point 125 (which coincides with point 123) corresponds to the end of the "zero period" $\Delta t^{zero}$ for a duration of the "zero period" $\Delta t^{zero}$ of 0.0 μs, the point 126 corresponds to the end of the "zero period" $\Delta t^{zero}$ for a duration of the "zero period" $\Delta t^{zero}$ of 5.0 μs, the point 127 corresponds to the end of the "zero period" $\Delta t^{zero}$ for a duration of the "zero period" $\Delta t^{zero}$ of 10.0 μs, the point 128 corresponds to the end of the "zero period" $\Delta t^{zero}$ for a duration of the "zero period" $\Delta t^{zero}$ of 15.0 μs, the point 129 corresponds to the end of the "zero period" $\Delta t^{zero}$ for a duration of the "zero period" $\Delta t^{zero}$ of 20.0 μs, the point 1291 corresponds to the end of the "zero period" $\Delta t^{zero}$ for a duration of the "zero period" $\Delta t^{zero}$ of 25.0 μs, the point 1292 corresponds to the end of the "zero period" $\Delta t^{zero}$ for a duration of the "zero period" $\Delta t^{zero}$ of 30.0 μs, the point 1293 corresponds to the end of the "zero period" $\Delta t^{zero}$ for a duration of the "zero period" $\Delta t^{zero}$ of 35.0 μs, the point 1294 corresponds to the end of the "zero period" $\Delta t^{zero}$ for a duration of the "zero period" $\Delta t^{zero}$ of 40.0 μs. Some of the data points on the traces have been marked by dots. The size of the dots is proportional to the speed of the changes at the respective instance of time. There are fast changes at the beginning that slow down afterwards. Data points guaranteeing constant gain of the surviving channel can be found on the dash dotted line. In this example, we have $$\frac{\sigma_a^*(\lambda_{surv})}{\sigma_e^*(\lambda_{surv}) + \sigma_a^*(\lambda_{surv})} \approx 0.64$$

However, the increase of $\Delta\overline{P}_{pop}^{2nd}$ is almost equal to the decrease of $\Delta\overline{P}_{pop}^{3rd}$ ($\Delta\overline{P}_{pop}^{2nd} \approx -\Delta\overline{P}_{pop}^{3rd}$) directly after the drop, since the rate of stimulated transitions starting from the metastable level is quite small and the lifetime in the metastable level is significantly larger as compared with the pump level. This behaviour is independent of the duration of the zero period and explains why there are always some overshoots. Additional features of the gain transient can be understood from this parametric plot. For vanishing zero period, the population of the metastable level is increased by almost the same number as the population of the pump level decreases until the population of the pump level has reached its final value $\overline{P}_{pop}^{3rd}(\infty)$. Afterwards, there is some readjustment of the population probability of the metastable level that does not affect the pump level. Therefore, there are maximum overshoots for vanishing "zero period" $\Delta t^{zero}$, but no undershoot. Minimum magnitude of the overshoots may be achieved if the duration of the "zero period" $\Delta t^{zero}$ lasts until the population of the pump level has reached its final value for the first time (in the current example at 11.0 μs, 1295). For larger durations, some undershoots of $\overline{P}_{pop}^{3rd}$ are induced. However, this does not necessarily lead to undershoots of the gain. Gain undershoots happen only if the finally required readjustment of $\overline{P}_{pop}^{2nd}$ leads to some undershoots of this parameter. In the example, this happens for $\Delta t^{zero} \geq 18.4$ μs. Between the points 1295, which corresponds to a $\Delta t^{zero}$=11.0 μs, and 1296, which corresponds to a $\Delta t^{zero}$=18.4 μs, no undershoot occurs.

Other embodiments of the present invention may also include a drop scenario according to which channels other than the surviving channel are no longer suppressed completely but reduced in power by a factor called drop factor $D_{drop}$ that is varied during the investigations.

Figure 13:
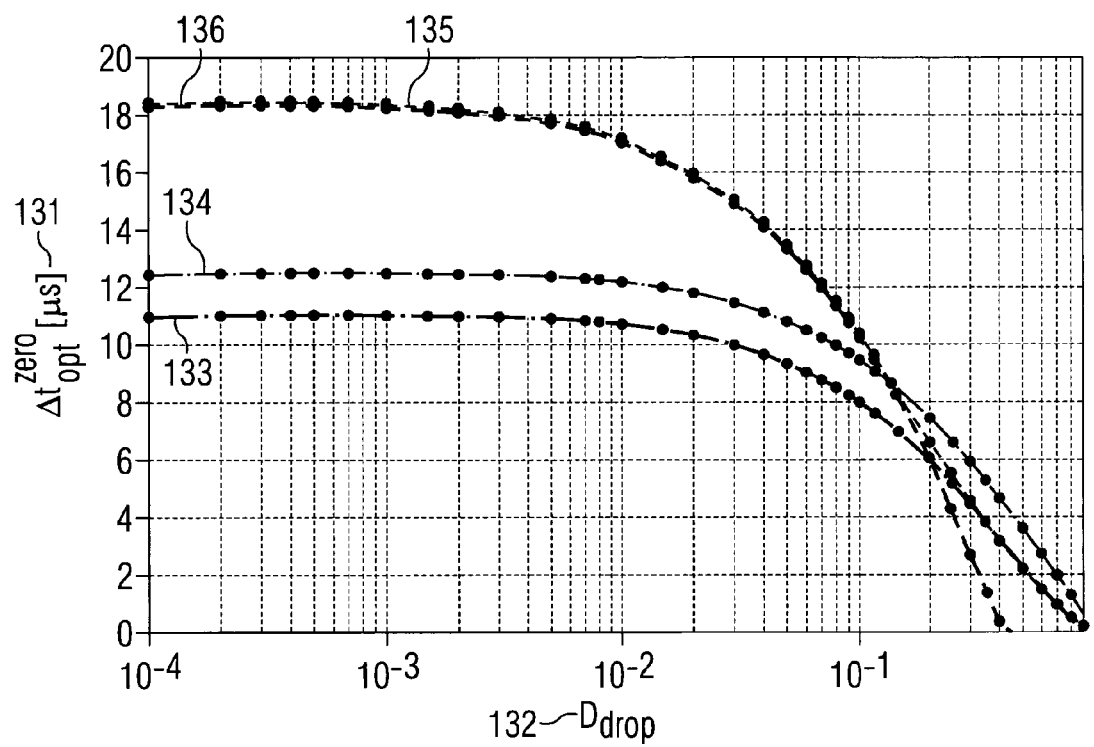
FIG. 13 is an illustration of a simulation which shows optimum duration of the "zero period" according to different criteria, namely leading to minimum overshoot, minimum undershoot, parameter $A_{dev}$, and minimum variation of $\overline{P}_{pop}^{3rd}$ versus drop factor $D_{drop}$ according to one embodiment of the invention.

FIG. 13 is an illustration of a simulation which shows optimum duration of the "zero period" $\Delta t_{opt}^{zero}$ 131 according to different criteria, namely leading to minimum overshoot, minimum undershoot, minimum parameter $A_{dev}$, and minimum variation of $\overline{P}_{pop}^{3rd}$ versus drop factor $D_{drop}$ 132 according to one embodiment of the invention. The lower curve 133 indicates the duration of the "zero period" $\Delta t^{zero}$ that is required to minimize the magnitude of the overshoots, whereas the upper curve 135 represents the maximum duration of the "zero period" $\Delta t^{zero}$ for which undershoots are still avoided. This implies that for all durations of the "zero period" $\Delta t^{zero}$ within the gray shaded area enclosed by two curves 133 and 135 overshoots are reduced to their minimum and there are no undershoots. Furthermore, an additional curve 136 indicates the value of $\Delta t^{zero}$ resulting in a minimum of the parameter $A_{dev}$. The fourth curve 134 indicates the time at which the population probability of the pump level has reached its final value for the first time if the pump is turned off. For drop factors in excess of 0.2, there is no duration yielding minimum gain overshoot without inducing some gain undershoot. Minimum overshoots may be achieved if the duration of the "zero period" is equal to or larger than the period of time required to reach the final value of $\overline{P}_{pop}^{3rd}$ for the first time. An analytical expression for this time $\Delta t_{opt}^{zero}$ can be derived directly from the differential equations for the two population probabilities by making use of some approximations and assuming that the control is able to determine the required pump powers $P_{pump}|^{before}$ and $P_{pump}|^{after}$ that keep the gain at a constant level before and after the drop, respectively. Suitable techniques complying with this task are known in the art. Due to pump excited state absorption, some pump photons do not participate in the amplification process. Since the analytical expression has been derived from the rate equations, we have to determine first the effective pump powers from the required pump powers. This can be done using known procedures. Thus, the effective pump powers are given by $$P_{pump}^{eff}|^{before} = P_0^{ESA}\ln\left(\frac{P_{pump}|^{before}}{P_0^{ESA}}+1\right) \quad (5)$$

$$P_{pump}^{eff}|^{after} = P_0^{ESA}\ln\left(\frac{P_{pump}|^{after}}{P_0^{ESA}}+1\right) \quad (6)$$

with the characteristic power $P_0^{ESA}$. With this result, the expression:

$$\Delta t_{opt}^{zero} = \tau_3 \ln\left\{\frac{\alpha_{fit} P_{pump}^{eff}|^{before}+1}{\alpha_{fit} P_{pump}^{eff}|^{after}+1}\right\} \quad (7)$$

allows to determine the required duration of the zero period, where $\tau_3$ stands for the lifetime of the pump level and $\alpha_{fit}$ is a parameter derived from different constants such as the density of the erbium ions. When added to FIG. 13, the corresponding curve is perfectly aligned with the already present curve 134.

Figure 14:
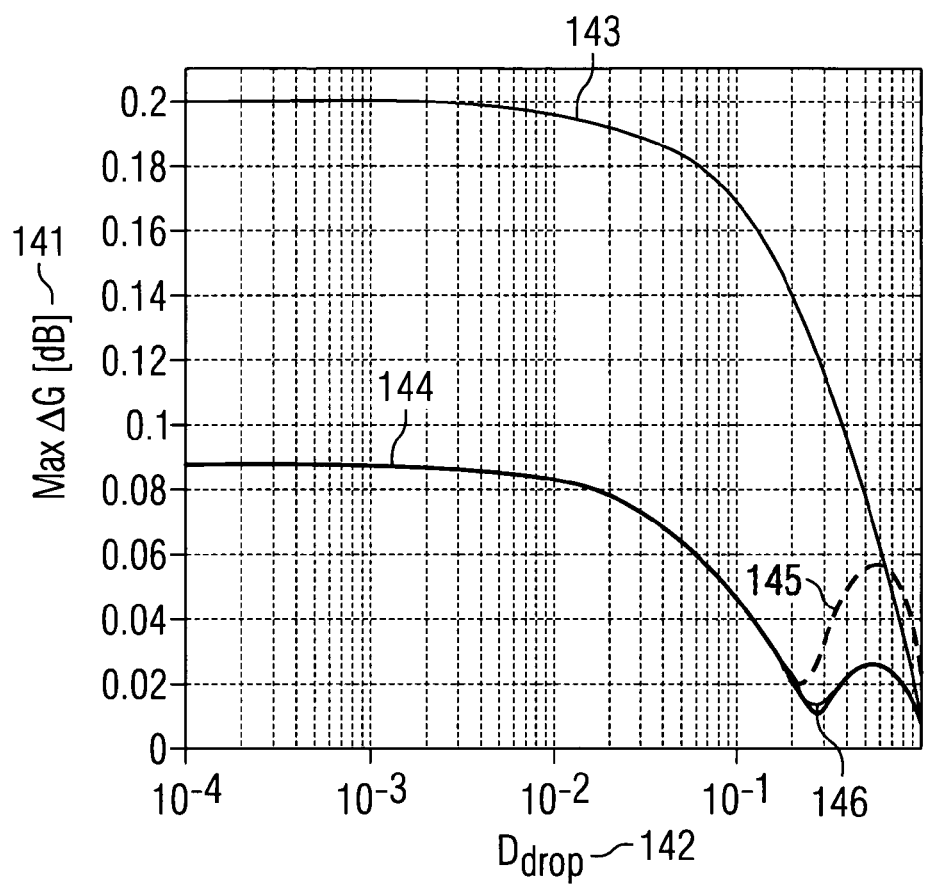
FIG. 14 is an illustration of a simulation which shows the maximum magnitude of the gain variations versus drop factor $D_{drop}$ for different durations of the "zero period" according to one embodiment of the invention.

FIG. 14 is an illustration of a simulation which shows the maximum magnitude of the gain variations Max $\Delta G$ 141 versus drop factor $D_{drop}$ 142 for durations of the "zero period"
$\Delta t^{zero}$ yielding optimum performance with respect to different criteria according to one embodiment of the invention.

In particular, setting the duration of the zero period $\Delta t^{zero}$ to values giving minimum overshoots results in the curve 144. Aiming for minimum undershoots at maximum duration of the zero period leads to the grey dashed curve 146. The dashed curve 145 shows the maximum magnitude of gain variations for settings of the duration of the "zero period" $\Delta t^{zero}$ which lead to minimum variation of the population probability in the pump level. Curve 143 shows the maximum gain variations for conventional feedforward controls with "zero period" $\Delta t^{zero}=0$. For drop factors $D_{drop}$ 142 smaller than 0.2, all shown settings of the duration different to zero (curves 144,145 and 146) give identical results that are significantly better as compared with the case without "zero period" $\Delta t^{zero}$ (curve 143). At larger values of the drop factor, settings according to equation (7) lead to variations that are smaller or only marginally larger than the results "zero period" $\Delta t^{zero}$ (curve 143). Nevertheless, the gain variations could be reduced by choosing slightly smaller durations. In conclusion, setting the duration of the "zero period" $\Delta t^{zero}$ according to equation (7), i.e. $\Delta t^{zero}=\Delta t_{opt}^{zero}$, gives significant improvement of transient performance for the most important scenarios. Furthermore, the implementation of the technique is very easy.

Figure 15:
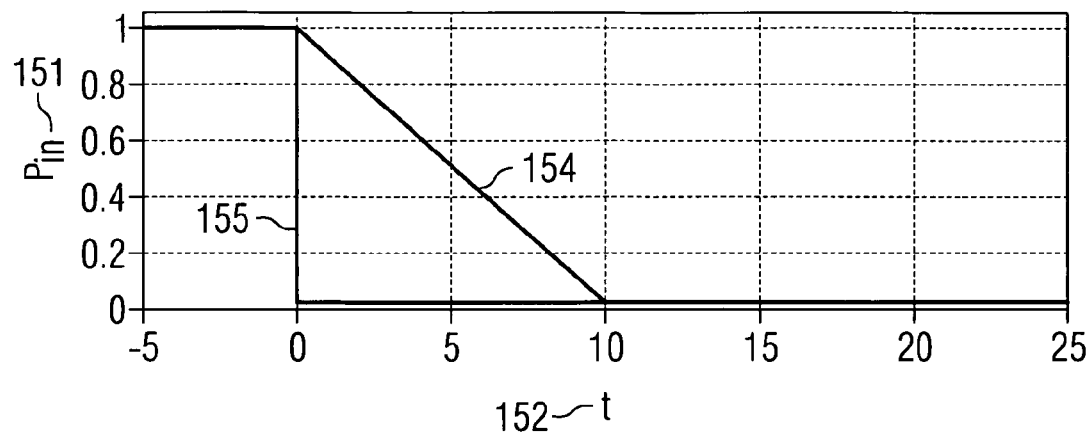
FIG. 15 is an illustration of a simulation which shows the evolution of the input power versus time according to a scenario characterized by a much slower transition from the initial power level to a second power level according to another embodiment of the invention.

FIG. 15 is an illustration of a simulation which shows the evolution of the input power $P_{in}$ 151 versus time 152 according to a scenario characterized by a much slower transition from the initial power level to a second power level according to another embodiment of the invention, in particular assuming that the input power $P_{in}$ 151 is reduced linearly 154 with time 152 and not abruptly 155 as assumed so far.

The duration from the start of the drop until the final value has been reached is called transition time $t_{trans}$. Evolution of the input power versus time is shown in FIG. 15 for vanishing transition time $t_{trans}$ 155 and for a transition time $t_{trans}$ of 10 µs 154.

Figure 16:
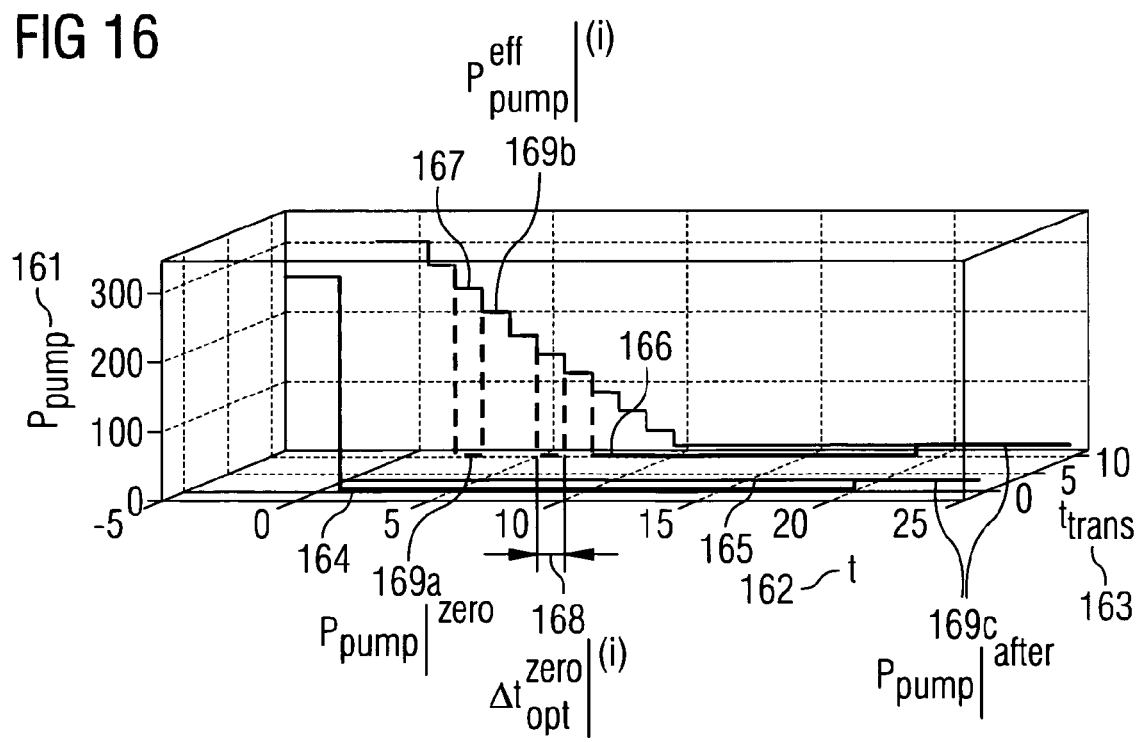
FIG. 16 is an illustration of a simulation which shows the evolution of the pump power versus time according to the same scenario as in FIG. 15 for different transition times.

FIG. 16 is an illustration of a simulation which shows the evolution of the pump power $P_{pump}$ 161 versus time 162 according to the same scenario as in FIG. 15 for vanishing transition time $t_{trans}$ (curve 165 with $\Delta t^{zero}=0$, which corresponds to the operation of a conventional amplifier, and curve 164 for $\Delta t^{zero}=\Delta t_{opt}^{zero}$) and for a transition time $t_{trans}$ of 10 µs (curve 167 with $\Delta t^{zero}=0$, which corresponds to the operation of a conventional amplifier, and curve 166 for $\Delta t^{zero}=\Delta t_{opt}^{zero}$). In both cases, for vanishing transition time $t_{trans}$ (164) and for a transition time $t_{trans}$ of 10 µs (166), the pump power $P_{pump}$ 151 is adjusted at $P_{pump}|^{after}$ for $$t > \Delta t_{opt}^{zero}\bigg|_{sum} = \sum_i \Delta t_{opt}^{zero}|^{(i)}.$$

The simulations include the effect of "spectral hole burning". It is assumed that a digital signal processor (DSP) capable of calculating updates of the required pump power every 1 µs is used. Thus, pump powers $P_{pump}^{eff}|^{(i)}$ 169b may be calculated. Using equation (7), the corresponding durations of the zero period $\Delta t_{opt}^{zero}|^{(i)}$ 169a can be calculated. The sum of these durations gives $$\Delta t_{opt}^{zero}\bigg|_{sum} = \sum_i \Delta t_{opt}^{zero}|^{(i)} = \quad (8)$$

-continued $$\sum_i \tau_3 \ln\left\{\frac{\alpha_{fit} P_{pump}^{eff}|^{(i-1)}+1}{\alpha_{fit} P_{pump}^{eff}|^{(i)}+1}\right\} = \tau_3 \ln\left\{\frac{\alpha_{fit} P_{pump}^{eff}|^{before}+1}{\alpha_{fit} P_{pump}^{eff}|^{after}+1}\right\}$$

This means that the durations $\Delta t_{opt}^{zero}|^{(i)}$ 169a calculated successively sum up to the duration that is calculated for a immediate drop to the final value. Although these mathematical calculations are exact, some further corrections may be required. Due to the use of a digital signal processor DSP, the minimum duration of a zero period is approximately 1 µs and it may be favourable to sum up the small durations until the sum equals at least 0.5 µs before setting the pump power to zero and to set the pump power to the same pump power level as a standard feedforward control would do. Setting the pump power to a slightly reduced power level different from zero may also introduce a reduction of the population probability of the pump level. This has to be taken into account by a different correction factor. Results of the simulations indicate that equation (7) may overestimate the optimum duration of the zero period for small values. Since the zero periods calculated step by step can be quite small, some scaling may help to improve transient performance.

An algorithm can be implemented according to the following considerations.

First, a variable $\Delta t_{opt}^{zero}|^{memory}$ representing the accumulated values $\Delta t_{opt}^{zero}|^{(i)}$ 169a that have not been taken into account by a zero period can be introduced. At the beginning, the variable may be set to zero. Successively, the following steps may be repeated continuously.

1) The appropriate pump power according to the rules used for a standard feedforward control is calculated and the effective pump power is derived by making use of equation (6);
2) The corresponding duration of the zero period is determined following equation (7) which is scaled according to $$\Delta t_{opt}^{zero} = 0.5\left[1 + \text{erf}\left(\frac{\Delta t_{opt}^{zero}}{\Delta t_{opt}^{zero}|^{ref}}\right)\right]\Delta t_{opt}^{zero} \quad (9)$$

where $\Delta t_{opt}^{zero}|^{ref}$ is a constant value that takes into account that equation (7) can overestimate the optimum duration for small values. A typical value of this constant may be in the range from 1 µs to 10 µs. Finally, the result can be added to the variable $\Delta t_{opt}^{zero}|^{memory}$. It should be noted that this step can be considered optional.

3) The pump power can be set to zero if $\Delta t_{opt}^{zero}|^{memory} \geq 0.5 \Delta t_{samp}$ and $\Delta t_{opt}^{zero}|^{memory}$ can be reduced by the duration of one sampling period $\Delta t_{samp}$, i.e. the time interval between two samples of the signals. Otherwise, the pump power may be set to the value of a standard feedforward control and the equation:

$$\Delta t_{opt}^{zero}|^{memory} = \Delta t_{opt}^{zero}|^{memory} - \left\{1 - \ln\left[1 + \frac{1}{2}(e^1 - 1)\frac{P_{pump}^{eff}|^{(i)}}{P_{pump}^{eff}|^{(i-1)}}\right]\right\}\Delta t_{opt}^{zero}$$

can be applied in order to take into account the effect on the population of the pump level.

Figure 17:
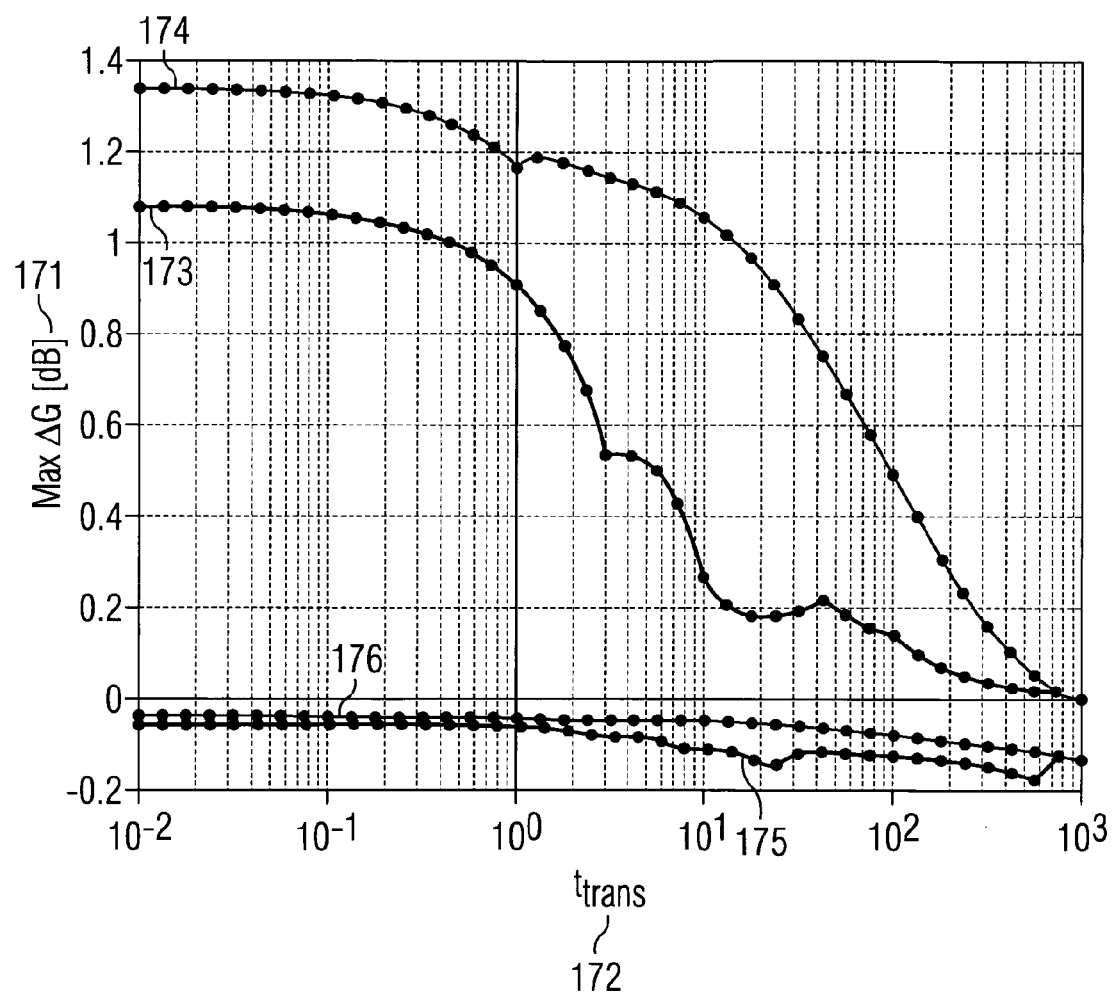
FIG. 17 is an illustration of a simulation which shows the maximum gain variation versus transition time for a standard feedforward control and for the feedforward control with "zero period" implementation according to an embodiment of the invention.

FIG. 17 is an illustration of a simulation which shows the maximum gain variation Max ΔG 171 versus transition time $t_{trans}$ 172 for a standard feedforward control and for the feedforward control with "zero period" implementation described above according to an embodiment of the invention. In particular maximum positive gain variation (curve 173 for a feedforward control making use of the "zero period" technique according to one embodiment of the invention and curve 174) and negative gain variations (curve 175 for a feedforward control making use of the "zero period" technique according to one embodiment of the invention and curve 176) are illustrated.

The above described implementation according to one embodiment of the invention provides a significant reduction of overshoots, especially for transition times up to 1 ms.

The invention claimed is:

1. A method for controlling a variation in gain of an amplifier stage of an optical amplifier, the amplifier stage receiving an input signal with non-zero input power and including a pumping device, the method comprising:
    detecting a change in the input power of the amplifier stage to a changed input power;
    determining from the changed input power a second power level, the second power level being able to drive the amplifier gain to a predetermined gain value after the change in the input power occurred;
    adjusting a pumping power of the pumping device to a first power level for a predetermined period of time, wherein the first power level is different from the second power level; and later
    adjusting the pumping power of the pumping device to the second power level.

2. The method according to claim 1, wherein the predetermined gain value is substantially equal to a first gain value, the first gain value being a gain of the amplifier stage prior to the change in the input power.

3. The method according to claim 2, which further comprises determining a third power level which maintains the gain of the amplifier stage at the first gain value.

4. The method according to claim 1, wherein the change in the input power of the amplifier stage is an abrupt change.

5. The method according to claim 4, which further comprises determining the predetermined period of time based on the following equation:

$$\Delta t_{opt}^{zero} = \tau_3 \ln\left\{\frac{\alpha_{fit} P_{pump}^{eff}|^{before}+1}{\alpha_{fit} P_{pump}^{eff}|^{after}+1}\right\},$$

where $\tau_3$ stands for a lifetime of the pump level, $\alpha_{fit}$, is a parameter including
a density of the erbium ions, $P_{pump}^{eff}|^{before}$ is given by the equation $$P_{pump}^{eff}|^{before} = P_0^{ESA} \ln\left(\frac{P_{pump}|^{before}}{P_0^{ESA}}+1\right),$$

where $P_{pump}|^{before}$ is the third power level and $P_{pump}^{eff}|^{after}$ is given by the equation $$P_{pump}^{eff}|^{after} = P_0^{ESA} \ln\left(\frac{P_{pump}|^{after}}{P_0^{ESA}}+1\right),$$

where $P_{pump}|^{after}$ is the second power level and $P_0^{ESA}$ is the characteristic power.

6. The method according to claim 1, wherein the change in the input power of the amplifier stage is a substantially linear change with time.

7. The method according to claim 5, which further comprises adjusting successively and alternatively the pumping power of the pumping device to intermediate power levels and at the first power level for predetermined periods of time.

8. The method according to claim 7, which further comprises determining the intermediate power levels $P_{pump}|^{(i)}$ by using means for measuring or means for calculating, said means for measuring or means for calculating including digital signal processors.

9. The method according to claim 8, wherein the step of determining the intermediate power levels $P_{pump}|^{(i)}$ further includes calculating the effective power levels $P_{pump}^{eff}|^{(i)}$.

10. The method according to claim 8, wherein the step of determining the intermediate power levels $P_{pump}^{eff}|^{(i)}$ and $P_{pump}|^{(i)}$ is effected with a sampling rate of approximately 1 MHz.

11. The method according to claim 7, which further comprises determining the predetermined periods of time ($\Delta t_{opt}^{zero}|^{(i)}$) based on an iterative equation:

$$\Delta t_{opt}^{zero}|^{(i)} = \tau_3 \ln\left\{\frac{\alpha_{fit} P_{pump}^{eff}|^{(i-1)} + 1}{\alpha_{fit} P_{pump}^{eff}|^{(i)} + 1}\right\},$$

wherein $\tau_3$ stands for a lifetime of the pump level and $\alpha_{fit}$ is a parameter including a density of erbium ions.

12. The method according to claim 1, wherein the change in the input power of the amplifier stage is based upon one or more events selected from the group consisting of:
removing a channel of a wavelength division multiplex signal transmitted,
a fiber break,
protection switching, and
component failures.

13. The method according to claim 12, wherein the first power level is lower than the second power level.

14. The method according to claim 13, wherein the first power level is approximately zero.

15. The method according to claim 1, wherein the change in the input power of the stage amplifier is based on adding a channel of a wavelength division multiplex signal transmitted.

16. The method according to claim 15, wherein the second power level is lower than the first power level.

17. The method according to claim 1, wherein the optical amplifier is a multistage amplifier.

18. An amplifier stage of an optical amplifier for amplifying a wavelength division multiplexing signal received by the amplifier stage and having non-zero input power, the amplifier stage comprising:
a pumping device for providing pumping power;
a control unit for detecting a change in the input power of the amplifier stage;
wherein said control unit is operable, on detecting a change in the input power of the amplifier stage to a changed input power, to determine from the changed input power a second power level which is able to drive an amplifier gain to a predetermined gain value after the change in the input power occurred, and to adjust a pumping power of the pumping device to a first power level for a predetermined period of time and later to the second power level, wherein the first power level is different from the second power level.

19. The amplifier stage according to claim 18, wherein said control unit is adjustable to operate a feed-forward control.

20. The amplifier stage according to claim 19, wherein said control unit is adjustable to operate a feed-forward and a feedback control.

* * * * *